United States Patent
Nogami et al.

(10) Patent No.: US 10,148,398 B2
(45) Date of Patent: Dec. 4, 2018

(54) APPARATUS, DEVICE AND METHOD THAT ENABLE EFFICIENT REFERENCE SIGNAL PLACEMENT AND ACQUIRES FEEDBACK INFORMATION

(71) Applicant: SHARP KABUSHIKI KAISHA, Osaka-shi, Osaka (JP)

(72) Inventors: Toshizo Nogami, Osaka (JP); Kazuyuki Shimezawa, Osaka (JP); Shohei Yamada, Osaka (JP); Wahoh Oh, Osaka (JP)

(73) Assignee: SHARP KABUSHIKI KAISHA, Sakai, Osaka-Shi (JP)

( * ) Notice: Subject to any disclaimer, the term of this patent is extended or adjusted under 35 U.S.C. 154(b) by 132 days.

(21) Appl. No.: 15/051,379

(22) Filed: Feb. 23, 2016

(65) Prior Publication Data

US 2016/0173258 A1   Jun. 16, 2016

Related U.S. Application Data

(63) Continuation of application No. 14/288,191, filed on May 27, 2014, which is a continuation of application
(Continued)

(30) Foreign Application Priority Data

Jun. 16, 2009   (JP) ................................ 2009-142873

(51) Int. Cl.
*H04W 4/00*   (2018.01)
*H04L 5/00*   (2006.01)
(Continued)

(52) U.S. Cl.
CPC .......... *H04L 5/0048* (2013.01); *H04B 7/024* (2013.01); *H04B 7/063* (2013.01); *H04L 1/0026* (2013.01);
(Continued)

(58) Field of Classification Search
CPC .................................................... H04B 7/024
See application file for complete search history.

(56) References Cited

U.S. PATENT DOCUMENTS 8,219,128 B2   7/2012   Zangi et al.
8,467,367 B2   6/2013   Malladi et al.
(Continued)

FOREIGN PATENT DOCUMENTS

CN   101208887 A   6/2008

OTHER PUBLICATIONS

3GPP Technical Specification Group Radio Access Network; Evolved Universal Terrestrial Radio Access (E-UTRA); Physical Layer Procedures (Release 8), Dec. 2008, 3GPP TS 36.213 V8.5.0 (Dec. 2008)
(Continued)

*Primary Examiner* — Guang W Li
(74) *Attorney, Agent, or Firm* — Birch, Stewart, Kolasch & Birch, LLP.

(57) ABSTRACT

A communication system where a terminal apparatus (UE) communicates with a base station apparatus (BS) that configures a first cell. The UE acquires, from the BS, first information and second information, whereby the first information specifying a first number indicating a first subframe, the first subframe including a first resource element in which a first reference signal of the first cell is placed, the second information specifying a second number indicating a second subframe, the second subframe including a second resource element in which a second reference signal of a second cell other than the first cell is to be placed, and the second resource element being not used to transmit a signal of the first cell. The UE also demaps data, whereby, in the second subframe, the data is mapped on resource elements which do not include the second resource element.

8 Claims, 20 Drawing Sheets

Related U.S. Application Data

No. 13/378,017, filed as application No. PCT/JP2010/003632 on May 31, 2010, now Pat. No. 8,774,290.

(51) Int. Cl.

| | | |
|---|---|---|
| *H04B 7/024* | (2017.01) | |
| *H04B 7/06* | (2006.01) | |
| *H04L 1/00* | (2006.01) | |
| *H04B 7/0417* | (2017.01) | |
| *H04W 72/04* | (2009.01) | |

(52) U.S. Cl.
CPC .......... *H04L 1/0028* (2013.01); *H04L 5/0007* (2013.01); *H04L 5/0023* (2013.01); *H04L 5/0035* (2013.01); *H04L 5/0042* (2013.01); *H04L 5/0057* (2013.01); *H04L 5/0073* (2013.01); *H04L 5/0094* (2013.01); *H04B 7/0417* (2013.01); *H04L 2001/0092* (2013.01); *H04W 72/0406* (2013.01)

(56) References Cited

U.S. PATENT DOCUMENTS

| | | | |
|---|---|---|---|
| 8,559,359 B2 | 10/2013 | Lott et al. | |
| 8,755,806 B2 | 6/2014 | Shen et al. | |
| 8,937,875 B2* | 1/2015 | Hoshino | H04L 1/0026 370/252 |
| 9,219,532 B2* | 12/2015 | Nishio | H04W 72/10 |
| 2007/0021130 A1 | 1/2007 | Taira | |
| 2007/0053449 A1 | 3/2007 | Adachi | |
| 2008/0253469 A1 | 10/2008 | Ma et al. | |
| 2009/0011767 A1* | 1/2009 | Malladi | H04B 1/713 455/450 |
| 2009/0028258 A1 | 1/2009 | Ma et al. | |
| 2010/0189038 A1* | 7/2010 | Chen | H04L 1/0001 370/328 |
| 2010/0195566 A1* | 8/2010 | Krishnamurthy | H04L 5/0007 370/328 |
| 2010/0272032 A1* | 10/2010 | Sayana | H04B 7/024 370/329 |
| 2012/0099462 A1* | 4/2012 | Yuda | H04W 24/10 370/252 |
| 2012/0327876 A1* | 12/2012 | Ouchi | H04B 1/713 370/329 |

OTHER PUBLICATIONS

3GPP Technical Specification Group Radio Access Network; Further Advancements for E-UTRA Physical Layer Aspects (Release X), Jan. 2009, 3GPP TR 36.814 V0.3.2 (Jan. 2009).

3GPP TSG RAN WG1 #56-bis, R1-091351, "CSI-RS design for LTE-Advanced downlink", Mar. 2009.

3GPP TSG-RAN WG1 #56, R1-090875, "Further Considerations and Link Simulations on Reference Signal in LTE-A", Feb. 2009.

Huawei, CMCC, "Further Discussions on the Downlink Coordinated Transmission—Impact on the Radio Interface", 3GPP TSG RAN WG1 Meeting #55bis, Ljubljana, Slovenia, Jan. 7, 2009, R1-090129.

International Search Report dated Jul. 13, 2010 for PCT/JP2010/003632.

Samsung, DL RS Designs for LTE-Advanced[online], 3GPP TSG-RAN WG1#56b R1-091231, Mar. 23, 2009, Internet <URL:http://www.3gpp.org/ftp/tsg_ran/WG1_RL1/TSGR1_56b/Docs/R1-091231.zip>.

U.S. Advisory Action issued in U.S. Appl. No. 13/378,017 on Nov. 18, 2013.

U.S. Final Office Action issued in U.S. Appl. No. 13/378,017 dated Jul. 18, 2013.

U.S. Notice of Allowance issued in U.S. Appl. No. 13/378,017 dated Feb. 28, 2014.

U.S. Office Action issued in U.S. Appl. No. 13/378,017 dated Jan. 15, 2013.

ZTE, "Resource Mapping Issues on JP Transmission in CoMP", TSG-RAN WG1 Meeting #55bis, Ljubljana, Slovenia, Jan. 7, 2009, R1-090070.

U.S. Advisory Action issued in U.S. Appl. No. 14/288,191 dated Apr. 29, 2015.

U.S. Advisory Action issued in U.S. Appl. No. 14/288,191 dated Feb. 2, 2016.

U.S. Final Office Action issued in U.S. Appl. No. 14/288,191 dated Jan. 23, 2015.

U.S. Final Office Action issued in U.S. Appl. No. 14/288,191 dated Oct. 23, 2015.

U.S. Office Action issued in U.S. Appl. No. 14/288,191 dated Jul. 24, 2014.

U.S. Office Action issued in U.S. Appl. No. 14/288,191 dated Jun. 2, 2015.

\* cited by examiner

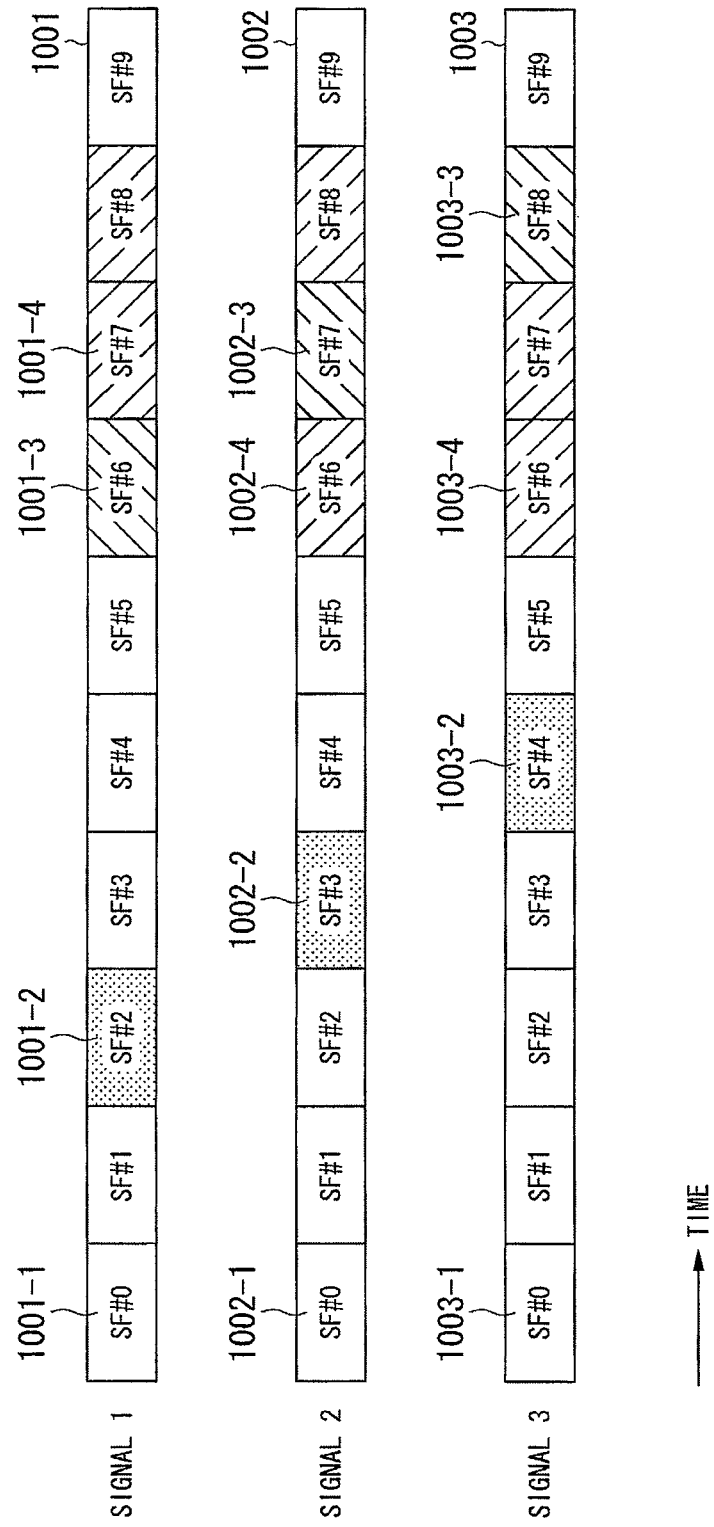

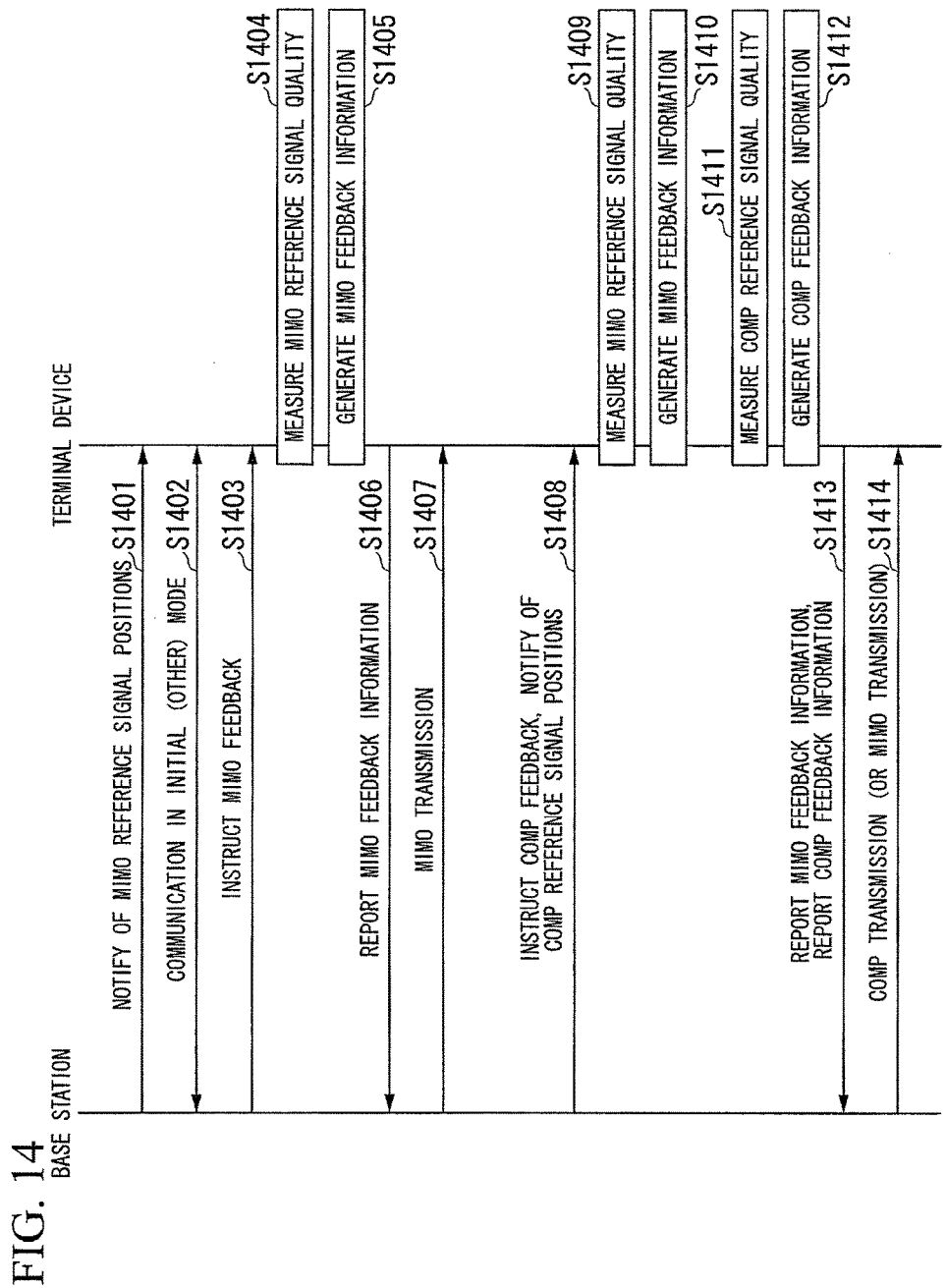

FIG. 17
CONVENTIONAL
ART
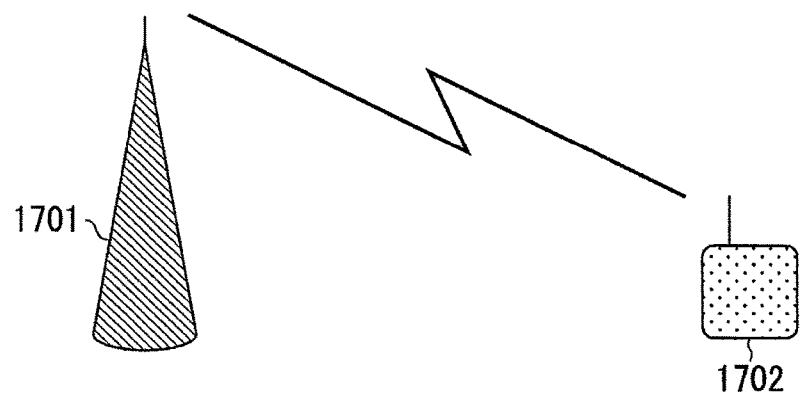
FIG. 18
CONVENTIONAL
ART
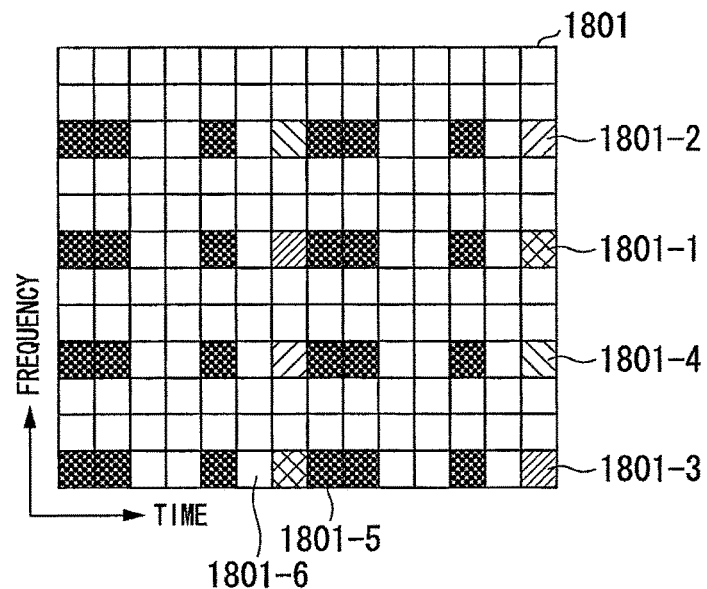

APPARATUS, DEVICE AND METHOD THAT ENABLE EFFICIENT REFERENCE SIGNAL PLACEMENT AND ACQUIRES FEEDBACK INFORMATION

CROSS-REFERENCE TO RELATED APPLICATIONS

This application is a Continuation of co-pending application Ser. No. 14/288,191 filed on May 27, 2014, which is a Continuation of application Ser. No. 13/378,017 filed on Dec. 13, 2011, now U.S. Pat. No. 8,744,290 issued on Jul. 8, 2014, and which is the national phase of PCT International Application No. PCT/JP2010/003632 filed on May 31, 2010, which claims priority under 35 U.S.C. 119(a) to Japanese Application No. 2009-142873, filed in Japan on Jun. 16, 2009. The entire contents of each of the above-identified applications are hereby incorporated by reference.

TECHNICAL FIELD

The present invention relates to a transmitter apparatus, a receiver apparatus, a communication system, and a communication method.

BACKGROUND ART

Known mobile wireless communication systems include those such as WCDMA (Wideband Code-Division Multiple Access), LTE (Long Term Evolution), LTE-A (LTE-Advanced) and WiMAX (Worldwide Interoperability for Microwave Access), in accordance with 3GPP (Third Generation Partnership Project). In these mobile wireless communication systems, an area that is covered by a base station (base station apparatus, transmitting station, transmitter apparatus, eNodeB) or a transmitting station that is in accordance with a base station has a cellular configuration in which a plurality of cells are disposed, thereby enabling an expansion of the communication area.

By using different frequencies between adjacent cells or between adjacent sectors, even for terminal devices (receiver apparatuses, receiving stations, mobile stations, mobile terminals, UE (user equipment)) in a cell edge region or a sector edge region, it is possible to perform communication without interference from the transmitted signals from a plurality of base stations. In this case, however, there is the problem of a poor rate of frequency spectrum utilization. By using the same frequency between adjacent cells or sectors, it is possible to improve the rate of frequency spectrum utilization. In this case, however, interference countermeasures are necessary to handle interference to terminal devices positioned in a cell edge region.

A method of suppressing interference with respect to terminal devices in a cell edge region by performing cooperative communication between cells, in which there is mutual cooperation between adjacent cells is under study as such an interference countermeasure. As such a method, Non-Patent Document 1 discloses a CoMP (Cooperative Multipoint) transfer system (cooperative communication system) and the like. As the CoMP system, disclosure is made of joint processing, in which cooperative transmission is done of the same or different data between cells, joint transmission, coordinated scheduling, in which scheduling and controlling is done by coordination between cells, and beamforming.

By performing adaptive control of the modulation method, the coding scheme (MCS: Modulation and Coding Scheme), the spatial multiplexing (layers and ranks) and precoding weight (precoding matrix) in accordance with the transfer status between a base station and a terminal device, it is possible to achieve data transfer with improved efficiency. Non-Patent Document 2 discloses a method that applies these types of control.

FIG. 17 is a drawing that shows a base station 1701 and a terminal device 1702 that perform non-cooperative communication (non-CoMP) with, for example, MIMO (multiple-input multiple-output) transmission from a single cell in LTE-A. A proposal is made of the terminal device 1702 in LTE-A using a reference signal (RS) transmitted from the base station 1701, a pilot signal, a known signal, and a propagation channel status measurement reference signal, the CSI-RS (Channel State Information RS) to transmit feedback information to the base station 1701. The reference signal is transmitted to the terminal device 1702 from the base station 1701.

The terminal device 1702 transmits feedback information generated based on the reference signal to base station 1701. In the case of the downlink used for data transfer from the base station 1701 to the terminal device 1702, in order to perform the above-noted adaptive control, the downlink propagation channel status or the like is estimated at the terminal device 1702 based on the reference signal transmitted from the base station 1701. Then, estimated propagation channel status or the like is transmitted (fed back) to the base station 1701 via the uplink that performs data transfer from the terminal device 1702 to the base station 1701. Non-Patent Document 3 proposes the placement of a reference signal in only some of the subframes, rather than locating the reference signal in all subframes on the time axis when locating the reference signal.

FIG. 18 is a drawing showing an example of a reference signal transmitted to the base station 1701. In FIG. 18, the horizontal axis indicates time and the vertical axis indicates frequency. The various square regions within a resource block (RB) 1801 that is defined by a prescribed time and frequency indicate resource elements (this indicates the region in which the modulating symbol is mapped REs). The reference numerals 1801-1 to 1801-4 indicate resource elements onto which the LTE-A reference signal is mapped. The reference numeral 1801-5 indicates the resource element onto which the LTE reference signal is mapped.

The reference numeral 1801-6 indicates a resource element onto which a signal other than the reference signal (that is, a data signal or control signal or the like) is mapped. As the position of the reference signal, it is possible to use a reference signal scattered among the resource elements in the frequency direction and the time direction. The UE in the LTE-A system can use information that indicates the channel characteristics (CSI: Channel State Information), the recommended transmission format information with respect to the base station (CQI: Channel Quality Indicator), and the RI (Rank Indicator) and PMI (Precoding Matrix Index) as the information (feedback information) to the base station, which is generated based on this LTE-A reference signal.

FIG. 19 is a drawing showing a base station 1901, a base station 1902, and a terminal device 1903 that perform CoMP communication in the LTE-A system. A proposal has been made for the terminal device 1903 using the reference signals transmitted from each of the base stations 1901 and 1902 to generate feedback information, and transmitting the generated feedback information to the base station 1901 in the LTE-A system. In Non-Patent Document 4, there is a proposal for puncturing data from the base station 1902 at the terminal device 1903 when the reference signal is transmitted from the base station 1901, for the purpose of measuring the reference signal with high accuracy when performing CoMP communication in the LTE-A system (that is, data is not mapped onto the resource element, or data transmission is stopped).

PRIOR ART DOCUMENTS

Non-Patent Document

Non-Patent Document 1: 3rd General Partnership Project; Technical Specification Group Radio Access Network; Further Advancements for E-UTRA Physical Layer Aspects (Release X), January 2009, 3GPP TR 36.814 V0.3.2 (2009-01)

Non-Patent Document 2: 3rd General Partnership Project; Technical Specification Group Radio Access Network; Evolved Universal Terrestrial Radio Access (E-UTRA); Physical Layer Procedures (Release 8), December 2008, 3GPP TS 36.213 V8.5.0 (2008-12)

Non-Patent Document 3: 3GPP TSG RAN WG1 #56-bis, R1-091351, "CSI-RS design for LTE-Advanced downlink", March 2009

Non-Patent Document 4: 3GPP TSG-RAN WG1 #56, R1-090875, "Further Considerations and Link Simulations on Reference Signal in LTE-A", February 2009

DISCLOSURE OF INVENTION

Problem to be Solved by the Invention

In conventional communication schemes, however, in a communication system capable of non-cooperative communication and cooperative communication, it is difficult to efficiency place the reference signal and difficult to acquire appropriate feedback information, this hindering improvement in the transfer efficiency.

The present invention was made in consideration of the above-noted problems, and has as an object to provide a transmitter apparatus, a receiver apparatus, a communication system, and a communication method that, in a communication system capable of non-cooperative communication and cooperative communication, enable efficient reference signal placement and the acquisition of appropriate feedback information.

Means for Solving the Problem (1) The present invention has been made to solve the above-described problems, and a first aspect of the present invention is a transmitter apparatus including: a reference signal transmitting unit that transmits a both of a first reference signal and a second reference signal differing from the first reference signal to a first receiver apparatus performing non-cooperative communication and to a second receiver apparatus performing cooperative communication, respectively; and a notifying unit that instructs the first receiver apparatus to measure the first reference signal and that instructs the second receiver apparatus to measure the second reference signal.

(2) In the first aspect of the present invention, the transmitter apparatus may further include a first mapping unit that maps the first reference signal and the second reference signal onto different resources.

(3) In the first aspect of the present invention, the first mapping unit may use the same stream as the first reference signal and the second reference signal.

(4) In the first aspect of the present invention, the transmitter apparatus may further include a second mapping unit that places the first reference signal and the second reference signal onto different subframes.

(5) A second aspect of the present invention is a transmitter apparatus including: a reference signal transmitting unit that transmits a both of a first reference signal and a second reference signal differing from the first reference signal to a first receiver apparatus performing non-cooperative communication and to a second receiver apparatus performing cooperative communication, respectively; and a notifying unit that notifies of information specifying a position of the first reference signal to the first receiver apparatus, and that notifies of information specifying a position of the second reference signal to the second receiver apparatus.

(6) A third aspect of the present invention is a receiver apparatus including: a first reference signal measuring unit that measures a first reference signal based on the instruction of measurement of the first reference signal from a transmitter apparatus performing communication by switching between non-cooperative communication and cooperative communication; and a second reference signal measuring unit that measures a second reference signal differing from the first reference signal based on the instruction of measurement of the second reference signal from the transmitter apparatus.

(7) In the third aspect of the present invention, the receiver apparatus may further include: a first feedback information generating unit that generates first feedback information using a measurement result of the first reference signal; and a second feedback information generating unit that generates second feedback information differing from the first feedback information using a measurement result of the second reference signal.

(8) A fourth aspect of the present invention is a communication system including a transmitter apparatus and a first and second receiver apparatuses, wherein the transmitter apparatus includes: a reference signal transmitting unit that transmits both of a first reference signal and a second reference signal differing from the first reference signal to the first receiver apparatus performing non-cooperative communication and to the second receiver apparatus performing cooperative communication, respectively; and a notifying unit that instructs the first receiver apparatus to measure the first reference signal and that instructs the second receiver apparatus to measure the second reference signal; and wherein the first receiver apparatus includes: a first reference signal measuring unit that measures the first reference signal; and the second receiver apparatus includes: a second reference signal measuring unit that measures the second reference signal.

(9) A fifth aspect of the present invention is a communication system including a transmitter apparatus and a receiver apparatus, wherein the transmitter apparatus includes: a reference signal transmitting unit that transmits a first reference signal and a second reference signal differing from the first reference signal to the receiver apparatus performing communication by switching between non-cooperative communication and cooperative communication; and a notifying unit that instructs the receiver apparatus to measure the first reference signal or to measure the second reference signal; and wherein the receiver apparatus includes: a first reference signal measuring unit that measures the first reference signal based on the instruction to measure the first reference signal from the transmitter apparatus; and a second reference signal measuring unit that measures the second reference signal based on the instruction to measure the second reference signal from the transmitter apparatus.

(10) A sixth aspect of the present invention is a communication method for transmitting the both of a first reference signal and a second reference signal differing from the first reference signal from a transmitter apparatus to a first receiver apparatus performing non-cooperative communication and to a second receiver apparatus performing cooperative communication, respectively, wherein the transmitter apparatus instructs the first receiver apparatus to measure the first reference signal; and the transmitter apparatus instructs the second receiver apparatus to measure the second reference signal.

(11) A seventh aspect of the present invention is a communication method, wherein a receiver apparatus measures a first reference signal based on the instruction to measure the first reference signal from a transmitter apparatus performing communication by switching between non-cooperative communication and cooperative communication; and the receiver apparatus measures a second reference signal differing from the first reference signal based on the instruction to measure the second reference signal from the transmitter apparatus.

Effects of the Invention

According to the present invention, it is possible in a communication system capable of non-cooperative communication and cooperative communication, to efficiently place the reference signal and to acquire appropriate feedback information.

BRIEF DESCRIPTION OF THE DRAWINGS

FIG. 10 is a drawing showing an example of the configuration of wireless frames in the same embodiment.

FIG. 14 is a sequence diagram showing an example of the processing between the base station (transmitter apparatus) and the terminal device (receiver apparatus) in a six embodiment of the present invention.

FIG. 17 is a drawing showing the configuration of a communication system that performs MIMO communication.

FIG. 18 is a drawing showing the configuration of the reference signal in a communication system that performs MIMO communication.

BEST MODE FOR CARRYING OUT THE INVENTION

First Embodiment

The first embodiment of the present invention will be described below, with references made to drawings.

Figure 1:
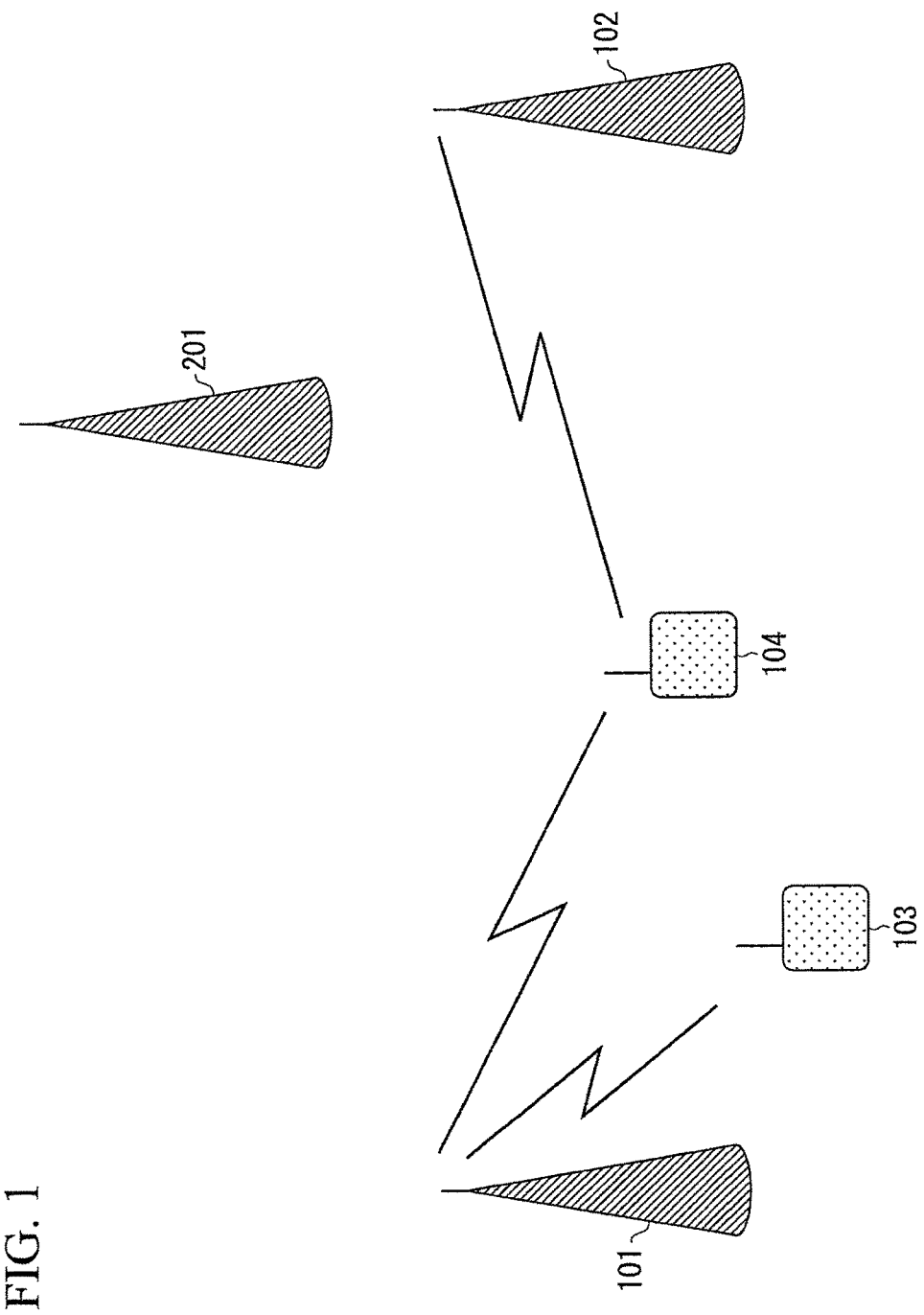
FIG. 1 is a schematic drawing showing the configuration of a communication system according to a first embodiment of the present invention.

FIG. 1 is a schematic drawing showing the configuration of a communication system according to the first embodiment of the present invention. The communication system of FIG. 1 includes base stations (transmitter apparatuses, base station apparatuses, eNodeB, eNB, cells, uplink receiver apparatuses) 101 and 102, which constituted each of the cells, and terminal devices (receiver apparatuses, UEs, uplink transmitter apparatuses) 103 and 104. The base station 101 and the terminal device 103 perform MIMO communication, which is non-CoMP (or SISO (single-input, single-output) communication and transmission diversity (TxD)).

The base station 101 and the base station 102 perform communication with the terminal device 104 by CoMP communication (cooperative communication). That is, at least both MIMO communication and CoMP communication are performed by the base station 101. Stated differently, the base station 101 houses both a terminal device (first receiver apparatus) 103 that performs MIMO communication and a terminal device (second receiver apparatus) 104 that performs CoMP communication. Although in this case the description is presented for the case in which the base station 101 houses the terminal device 103 and the terminal device 104 at the same time, this is not a restriction. The base station 101 may house the terminal device 103 and the terminal device 104 at different times. The base station 201 is a base station that has the possibility of cooperating with the base station 101 with respect to the terminal device 104.

The terminal device 103 that performs MIMO communication measures the reference signal transmitted from the base station 101, generates feedback information, and reports the generated feedback information to the base station 101. The terminal device 104 that performs CoMP communication measures the reference signal transmitted from the base station 101 and the reference signal transmitted from the base station 102, generates feedback information, and reports the generated feedback information to the base station 101 and/or the base station 102.

Figure 2:
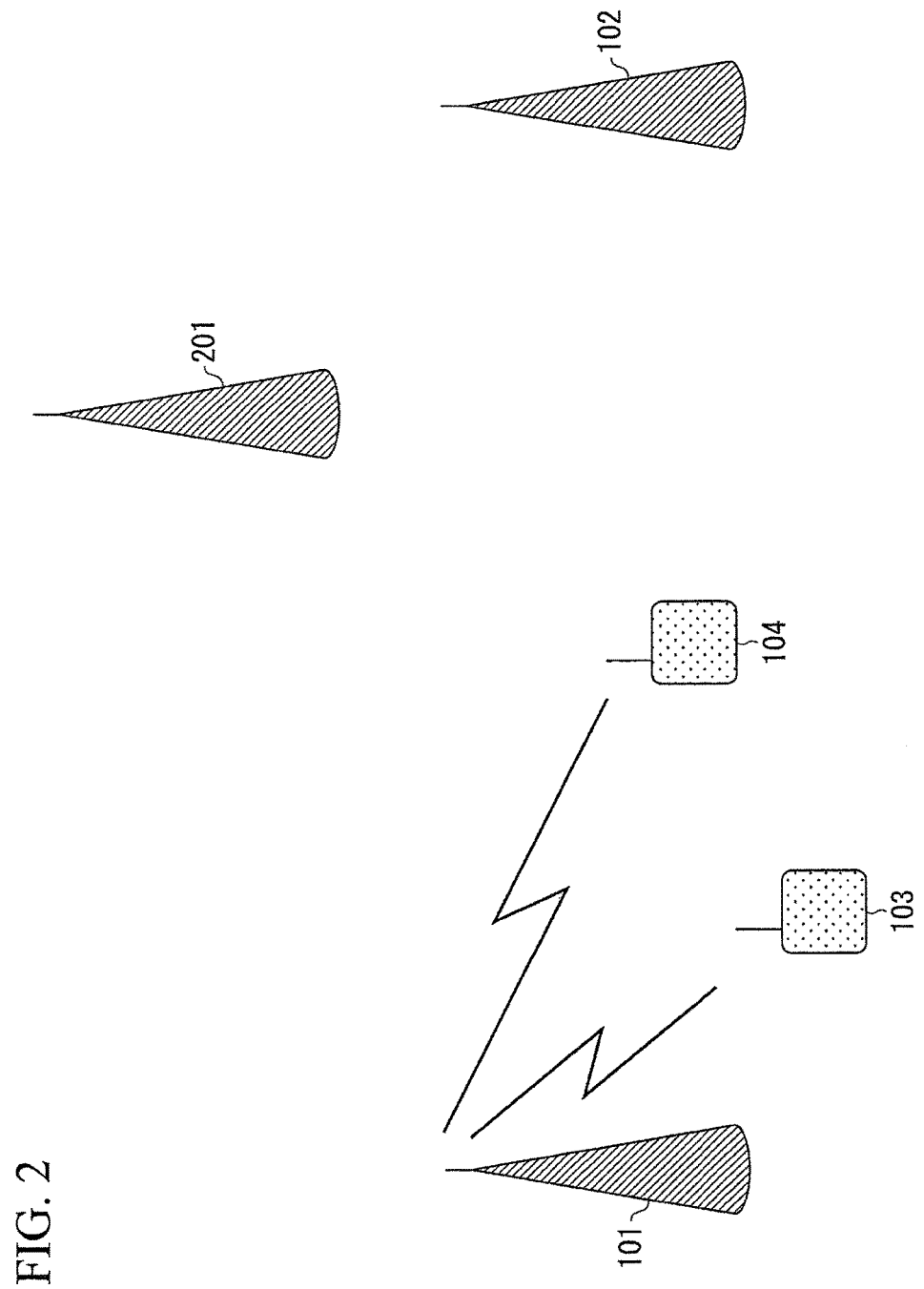
FIG. 2 is a schematic drawing showing the configuration of the communication system in the same embodiment.

FIG. 2 is a drawing showing the condition before the terminal device 104 shown in FIG. 1 performs CoMP. The terminal device 104 is housed in the base station 101. The base stations that have a possibility of cooperating with the base station 101 with respect to the terminal device 104 are both base station 101 and the base station 201. The base station 101 instructs the terminal device 104 to measure the reference signal transmitted from the base station 102 and the reference signal transmitted from the base station 201. The terminal device 104 reports a part or all of the measurement results to the base station 101. Based on the reported information, the base station 101 determines the base station to perform CoMP communication. In the case in which the base station 102 is selected, transition is made to CoMP such as shown in FIG. 1.

Figure 3A:
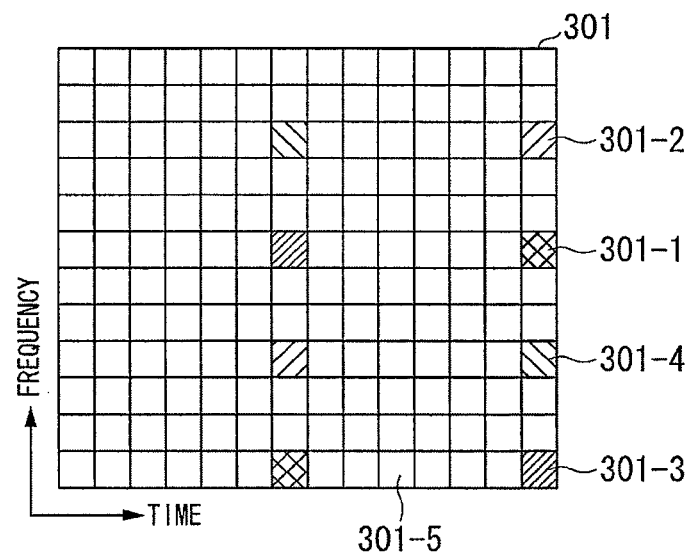
FIG. 3A is a drawing showing an example of the configuration of the reference signal in the same embodiment.
Figure 3B:
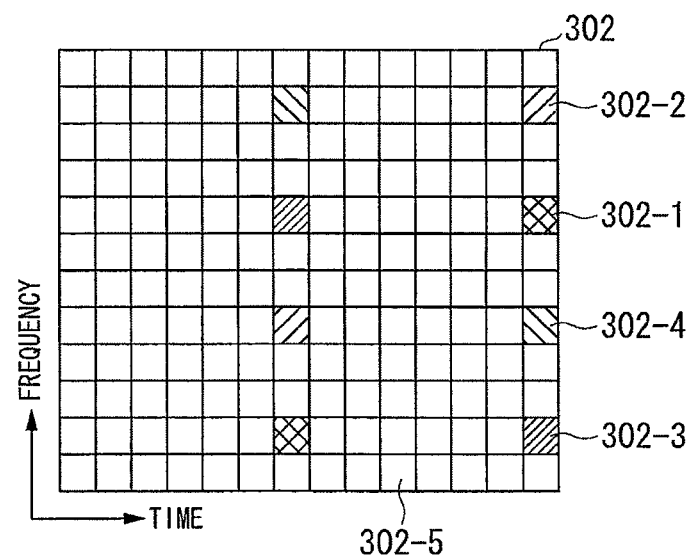
FIG. 3B is a drawing showing another example of the configuration of the reference signal in the same embodiment.
Figure 3C:
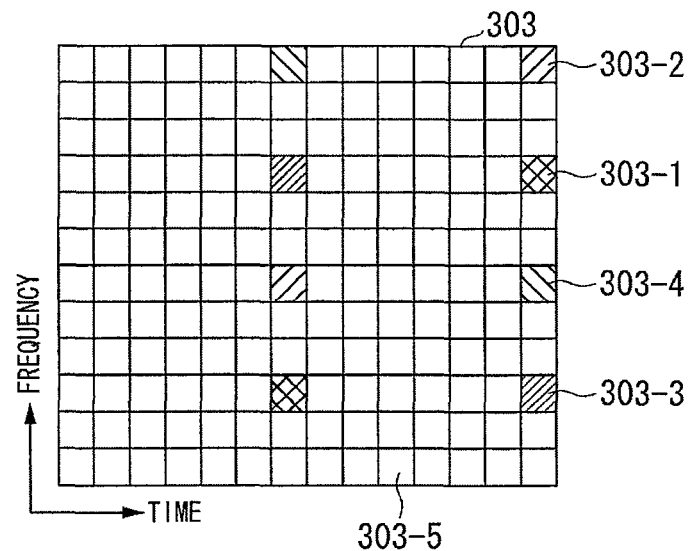
FIG. 3C is a drawing showing yet another example of the configuration of the reference signal in the same embodiment.

FIG. 3A to FIG. 3C are drawings showing examples of the configuration of the reference signals (propagation channel status measurement reference signals) referenced by a terminal device that does not perform CoMP. The resource block 301 shown in FIG. 3A is transmitted from the base station 101 that covers the cell #1, and includes the reference signal. The resource block 302 shown in FIG. 3B is transmitted from the base station 102 that covers the cell #2, and includes the reference signal. The resource block 303 shown in FIG. 3C is transmitted from the base station 103 that covers the cell #3, and includes the reference signal.

Although in this case, the group of 14 resource elements in the time direction and 12 resource elements in the frequency direction are referred to as a resource block, this is not a restriction. For example, the group of 14 resource elements in the time direction and 12 resource elements in the frequency direction may be called a resource block, and the above-noted resource block may be called a group of resource blocks. The resource elements 301-1 to 301-4 within the resource block 301 indicate resource elements onto which the LTE-A reference signal is mapped. The other resource element 301-5, is a resource element onto which signals other than an LTE-A reference signal (data signals, control signals, LTE reference signals, reference signals for modulation, or the like) are mapped.

The resource elements 301-1 to 301-4 are resource elements, onto each of which a reference signal corresponding to ports 1 to 4, respectively, which are mutually different ports (logical ports, antenna ports) are mapped. This applies also to the resource elements 302-1 to 302-5 within the resource block 302, and the resource elements 303-1 to 303-5 within the resource block 303. In this case, although the case in which the reference signals regarding the four ports are placed in one resource block is described, the reference signals regarding an arbitrary number of ports (for example, 1, 2, 4, or 8 ports) may be placed.

An example of the method of measuring the reception quality performed by the terminal device 103 shown in FIG. 2 will now be described. The terminal device 103 that is housed in the base station 101 that covers the cell #1 synthesizes the received signal at the resource elements 301-1 to 301-4 onto which the reference signals transmitted from the base station 101 are mapped for each port. By doing this, the terminal device 103 generates replicas of the received signals from the base station 101. Next, the terminal device 103 performs subtraction of the replicas from the received signals at the resource elements 301-1 to 301-4 and averaging. By doing this, the terminal device 103 calculates the signal (interference signal) and the electrical noise power transmitted from base stations other than the base station 101.

In this case, the cell #2 and the cell #3 transmit signals with the same time and frequency resources as the resource elements 301-1 to 301-4 (that is, puncturing is not done). For this reason, the interference signal includes the signal in the cell #2 (the signal mapped onto part of 302-5 in FIG. 3B) and the signal in the cell #3 (the signal mapped onto part of 303-5 in FIG. 3C). The terminal device 103 divides the replica electrical power by the interference signal and electrical noise power, so as to calculate the signal-to-interference-and-noise ratio (SINR). The terminal device 103 selects a CQI (Channel Quality Indicator) and an RI (Rank Indicator) so that a prescribed quality at the calculated SINR is satisfied. The terminal device 103 also selects a PMI (Precoding Matrix Index) so that the calculated SINR increased. In this manner, by measuring the resource elements 301-1 to 301-4 in the cell #1, which is a cell housed by the terminal device 103, the terminal device 103 generates feedback information that takes into consideration the interference signals and noise.

Figure 4A:
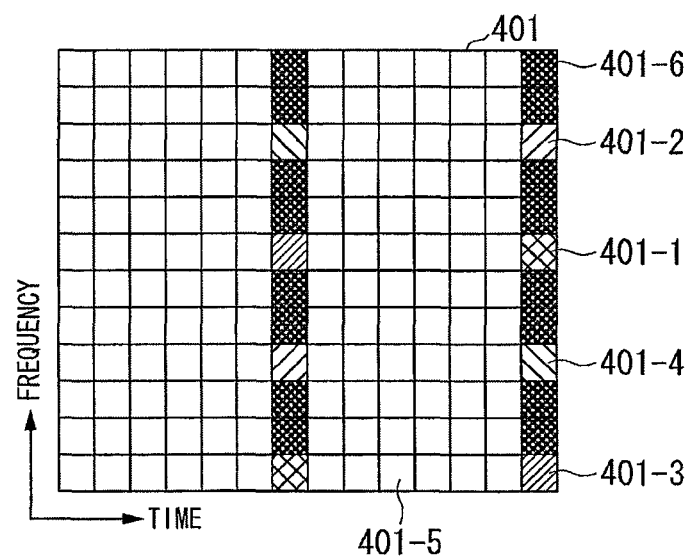
FIG. 4A is a drawing showing an example of the configuration of the reference signal in the same embodiment.
Figure 4B:
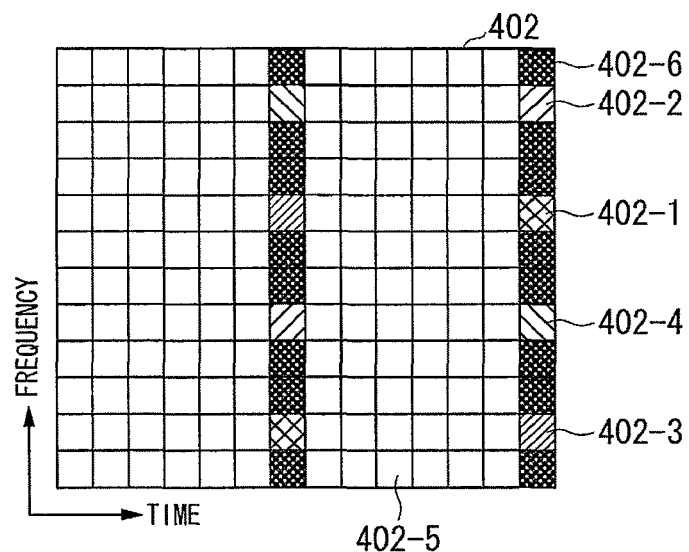
FIG. 4B is a drawing showing another example of the configuration of the reference signal in the same embodiment.
Figure 4C:
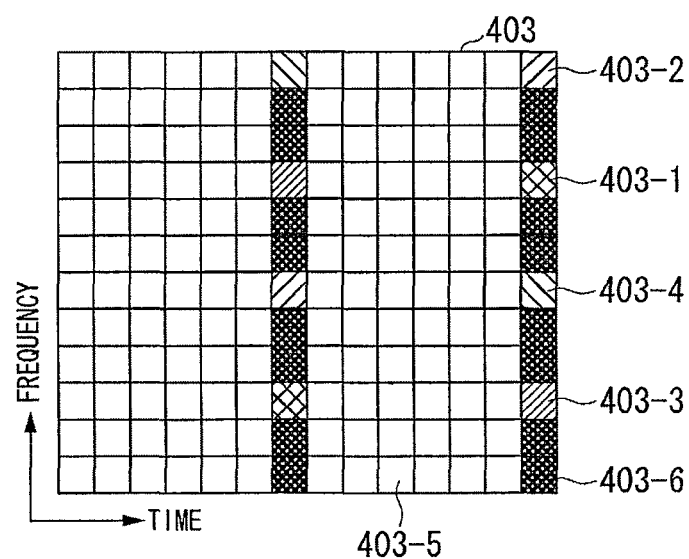
FIG. 4C is a drawing showing yet another example of the configuration of the reference signal in the same embodiment.

FIG. 4A to FIG. 4C are drawings showing examples of the configuration of reference signals referenced by a terminal device performing CoMP. The resource block 401 shown in FIG. 4A is transmitted from the base station 101 that covers the cell #1, and includes the reference signal. The resource block 402 shown in FIG. 4B is transmitted from the base station 102 that covers the cell #2, and includes the reference signal. The resource block 403 shown in FIG. 4C is transmitted from the base station 201 that covers the cell #3, and includes the reference signal.

The resource elements 401-1 to 401-4 within the resource block 401 are resource elements onto which LTE-A reference signals are mapped. The resource element 401-6 indicates that signal puncturing is done (that is, that the signal is not mapped or not transmitted). The other resource element 401-5 is a resource element onto which signals other than an LTE-A reference signal (a data signal, a control signal, an LTE reference signal, a reference signal for modulation, or the like) are mapped. The resource elements 401-1 to 401-4 indicate resource elements, onto each of which a reference signal corresponding to ports 1 to 4, respectively, which are mutually different ports (logical ports, antenna ports) are mapped.

Although in this case the description is for the case in which same port as for MIMO is used is CoMP as well, this is not a restriction. For example, the resource elements 401-1 to 401-4 may use ports 11 to 14, which are different than ports 1 to 4. This applies also to the resource elements 302-1 to 302-5 within the resource block 302, and the resource elements 303-1 to 303-5 within the resource block 303. In this case, however, similar to MIMO communication, although the description is for the case in which the reference signals for four ports are placed in one resource block, reference signals of a different number of ports may be placed.

Next, an example of the method of measuring the reception quality performed by the terminal device 104 will be described. The terminal device 104 that performs CoMP with the base station 101 that covers the cell #1 and the base station 102 that covers the cell #2 synthesizes the received signal at the resource elements 401-1 to 401-4 onto which the reference signals transmitted from the base station 101 are mapped for each port. By doing this, the terminal device 104 generates replicas of the received signals from base station 101. The terminal device 104 also synthesizes the received signal at the resource elements 402-1 to 402-4 onto which the reference signals transmitted from the base station 102 are mapped for each port. By doing this, the terminal device 104 generates replicas of the received signals from the base station 102.

In this case, the cell #2 and the cell #3 puncture signals with the same time and frequency resource with the resource elements 401-1 to 401-4. For this reason, it is possible to measure the replica of the received signal from the base station 101 with good accuracy, and without interference from the signal in the cell #2 and the signal in the cell #3. The same effect is achieved when generating a replica of the received signal from the base station 102. The feedback information (CSI: Channel State Information), the information that indicates the channel matrix or information for a processed channel matrix, or the CQI/PMI/RI is generated from the replicas obtained by the signal received from the base station 101 and by the signal received from the base station 102. In this manner, the terminal device 104 measures the resource elements 401-1 to 401-4 and the resource elements 402-1 to 402-4 in the cell #1 and the cell #2, which are cells that perform CoMP with the terminal device 104. By doing this, the terminal device 104 can generate feedback information with good accuracy (with little influence from interference).

Figure 5:
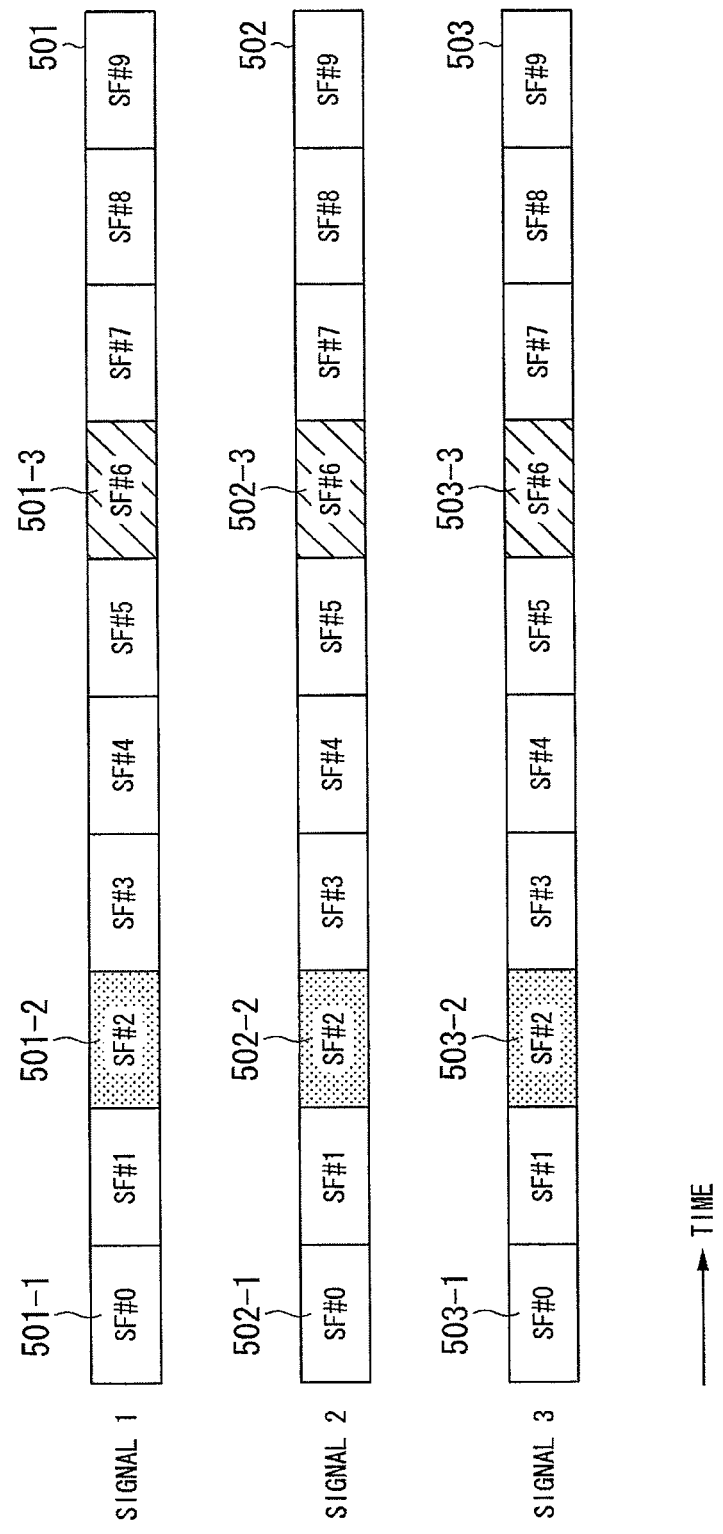
FIG. 5 is a drawing showing an example of the configuration of wireless frames in the same embodiment.

FIG. 5 is a drawing showing an example of the configuration of wireless frames transmitted from the base station 101, the base station 102, and the base station 201. In FIG. 5, the horizontal axis indicates time. The wireless frame 501 shown as the signal 1 in FIG. 5 is a wireless frame that is transmitted from the base station 101, which covers the cell #1. The wireless frame 502 shown as signal 2 in FIG. 5 is a wireless frame that is transmitted from the base station 102, which covers the cell #2. The wireless frame 503 shown as signal 1 in FIG. 5 is a wireless frame transmitted from the base station 201, which covers the cell #3. Each of the wireless frames 501 to 503 includes, respectively, the 10 subframes SF#0 to SF#9. This drawing shows the case in which wireless frames are synchronized between cells.

The subframes 501-2, 502-2, and 503-2 are subframes in which reference signals for MIMO communication in the cell #1, the cell #2, and the cell #3 are placed. The subframes 501-3, 502-3, and 503-3 are subframes in which reference signals for CoMP communication in the cell #1, the cell #2, and the cell #3 are placed. The other subframes 501-1, 502-1, and 503-1 are normal subframes.

In this case, the subframes 501-2, 502-2, and 503-2 are placed in the same time, and the subframes 501-3, 502-3, and 503-3 are placed in the same time. The subframes in which a reference signal for MIMO communication is placed and the subframes in which a reference signal for CoMP communication is placed are made to be different subframes.

Between cells capable of CoMP, the subframes in which a reference signal for CoMP is placed are synchronized (that is, are placed at the same time). By doing this, the proportion of normal subframes can be made large, and the efficiency of locating the reference signals can be improved.

The subframes in which a reference signal for MIMO communication is placed and the subframes in which a reference signal for CoMP communication is placed are made to be different subframes. By doing this, in a terminal device that performs MIMO communication, it is possible to generate feedback information that takes interference signals and noise into consideration. Also, in a terminal device performing CoMP communication, it is possible to generate feedback information with good accuracy (with little influence from interference).

As shown in FIG. 5, in the group of cells in which there is a possibility of performing CoMP, the numbers of subframes in which a CoMP reference signal is placed are set in the same manner. By doing this, there is no need to make new notification of the subframe numbers as information indicating the positions of CoMP reference signals in other cells, thereby improving the signaling efficiency.

Figure 6:
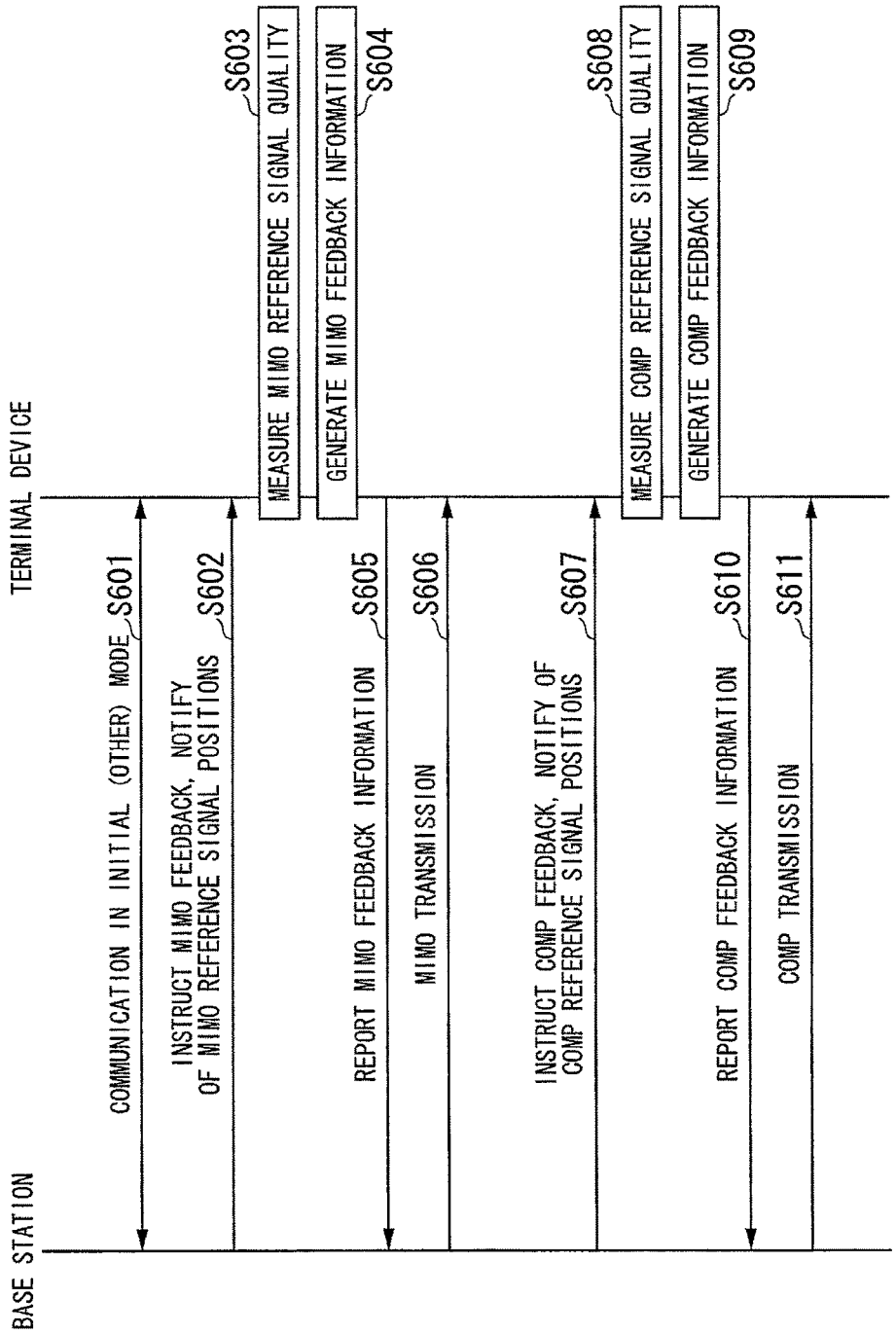
FIG. 6 is a sequence diagram showing an example of the processing between a base station (transmitter apparatus) and a terminal device (receiver apparatus) in the same embodiment.

FIG. 6 is a sequence diagram showing an example of the processing between the base station 101 (transmitter apparatus, housing base station, Serving Cell) and the terminal device 104 according to the present embodiment.

First, the base station 101 and the terminal device 104 perform communication in a mode that is neither the initial mode (TxD mode or the like) or the MIMO mode (step S601).

In the case of a transition to the MIMO mode, the base station 101 gives the instruction of feedback for MIMO to the terminal device 104, and makes notification of the positions of the reference signals for MIMO (step S602). For example, the base station 101 performs signaling that uses the physical control channel (PDCCH; Physical Downlink Control Channel) or higher-layer signaling (RRC signaling). In doing this, as the instruction of MIMO feed back, the feedback method may be specified regardless either explicit or implicit, the MIMO mode itself may also be specified, and both the MIMO mode itself and the feedback method may be specified.

By making a setting so that the notification of the positions of the MIMO reference signals is the trigger for the MIMO feedback, the notification itself of the positions of the MIMO reference signals can be the instruction of the MIMO feedback. The MIMO reference signal positions may be notified by the numbers of the subframes in which the MIMO reference signals have been placed, or being obtainable as subframes numbers in which placement was made, from a prescribed index of which notification is made and from another parameter (for example, a unique physical cell number, cell ID or the like) at the terminal device side. Additionally, it is possible to give notification of not only the subframe number, but also information regarding the positions of the resource elements (OFDM symbol number, resource block number, subcarrier number, frequency offset value, or a index that is specified using a lookup table of combination of these).

The terminal device 104 measures the quality of the MIMO reference signal step S603). Then, the terminal device 104, based on the measurement results from step S603, generates feedback information for MIMO (step S604). The terminal device 104 then reports the MIMO feedback information generated at step S604 to the base station 101 (step S605). The base station 101 determines the MIMO transmission parameters, referring to the feedback information, and performs MIMO transmission with respect to the terminal device 104 (step S606). During the MIMO communication, the processing of step S603 to step S606 is repeatedly performed.

In the case of transitioning from the MIMO mode to the CoMP mode, the base station 101 instructs the CoMP feedback to the terminal device 104. The base station 101 notifies the terminal device 104 of the positions of the CoMP reference signals (step S607). For example, the base station 101 performs signaling that uses the physical control channel (PDCCH) or higher-layer signaling (RRC signaling). In this case, the feedback method may be specified regardless of implicit/explicit as the CoMP feedback instruction, or the CoMP mode itself may be specified. By making the setting such that the notification of the CoMP reference signal positions is the trigger for the CoMP feedback, the notification itself of the CoMP reference signal positions can be the CoMP feedback instruction.

The numbers of the subframes in which the CoMP reference signals are placed in the local cell and in another cell that has the possibility of performing CoMP may be notified as the CoMP reference signal positions, and the numbers of subframes into which placement was done may be obtained from a prescribed index of which notification is made and from another parameter (for example, a unique physical cell number, cell ID or the like) at the terminal device 104 side. Also, the CoMP reference signal position in another cell may be information (subframe number or the like) that specifies a subframe at the local cell that corresponds to a subframe in which the CoMP reference signal is placed in the other cell. By doing this, not only is it possible for the terminal device 104 to know the subframe number of the local cell, but also the amount of processing done by the terminal device 104 can be reduced. For example, as the information to notify the terminal device 104 of the subframe in which the CoMP reference signal is placed in another cell, notification can be given of the subframe number of the corresponding local cell, and notification may be given of the relative offset value of the subframe number between the local cell and another cell, or the subframe number in another cell.

Additionally, notification may be made not only of the subframe number, but also of information regarding the position of a resource element (OFDM symbol number, resource block number, subcarrier number, frequency offset value (in the case in which the reference signal is offset in frequency based on the cell ID, the notification of the cell ID of another cell notifies implicitly of the reference signal position), or an index that specifies a combination of these, using a lookup table). By doing this, reference signal placement is possible with a high degree of freedom and, as a result, it is possible to improve the communication efficiency.

Alternatively, it is possible to adopt a scheme in which the subframe numbers for placement of the CoMP reference signals and the MIMO reference signals are made common for all cells beforehand, wherein when transitioning to the CoMP mode, notification is made of the relative offset value between the subframe numbers of the local cell and another cell. By doing this, it is possible to improve the efficiency of signaling regarding another cell.

It is not absolutely necessary that there be a relationship between the CoMP feedback instruction and the specification of the CoMP reference signal positions by another cell. For example, the cells (local cell and another cell) for which specification is made of the CoMP reference signal positions may be a set of cells for which the reference signal is measured, and a set of cells for generating feedback information may be a subset of the set of cells for measurement of the reference signals.

The terminal device 104 measures the quality of the CoMP reference signal at the local cell and/or another cell (step S608). The terminal device 104, based on the results of the measurement in step S608, generates CoMP feedback information (step S609), and reports the CoMP feedback information generated at step S609 to the base station 101 (step S610). The base station 101 determines the CoMP transmission parameters, referencing the feedback information, cooperates with another base station and performs CoMP transmission with respect to the terminal device 104 (step S611). During the CoMP communication, the processing of step S608 to step S611 is repeatedly performed. As necessary, the CoMP reference signal positions (the CoMP reference signal positions in another cell having the possibility of performing CoMP) may be notified to the terminal device 104 from the base station 101.

When switching to the transmitting mode, by instruction of the feedback method and notification of the positions of the reference signals, it is possible to perform efficient signaling regarding the feedback. By associating the instruction of the feedback method with the notification of the reference signal positions, it is possible to reduce the signaling overhead.

Figure 7:
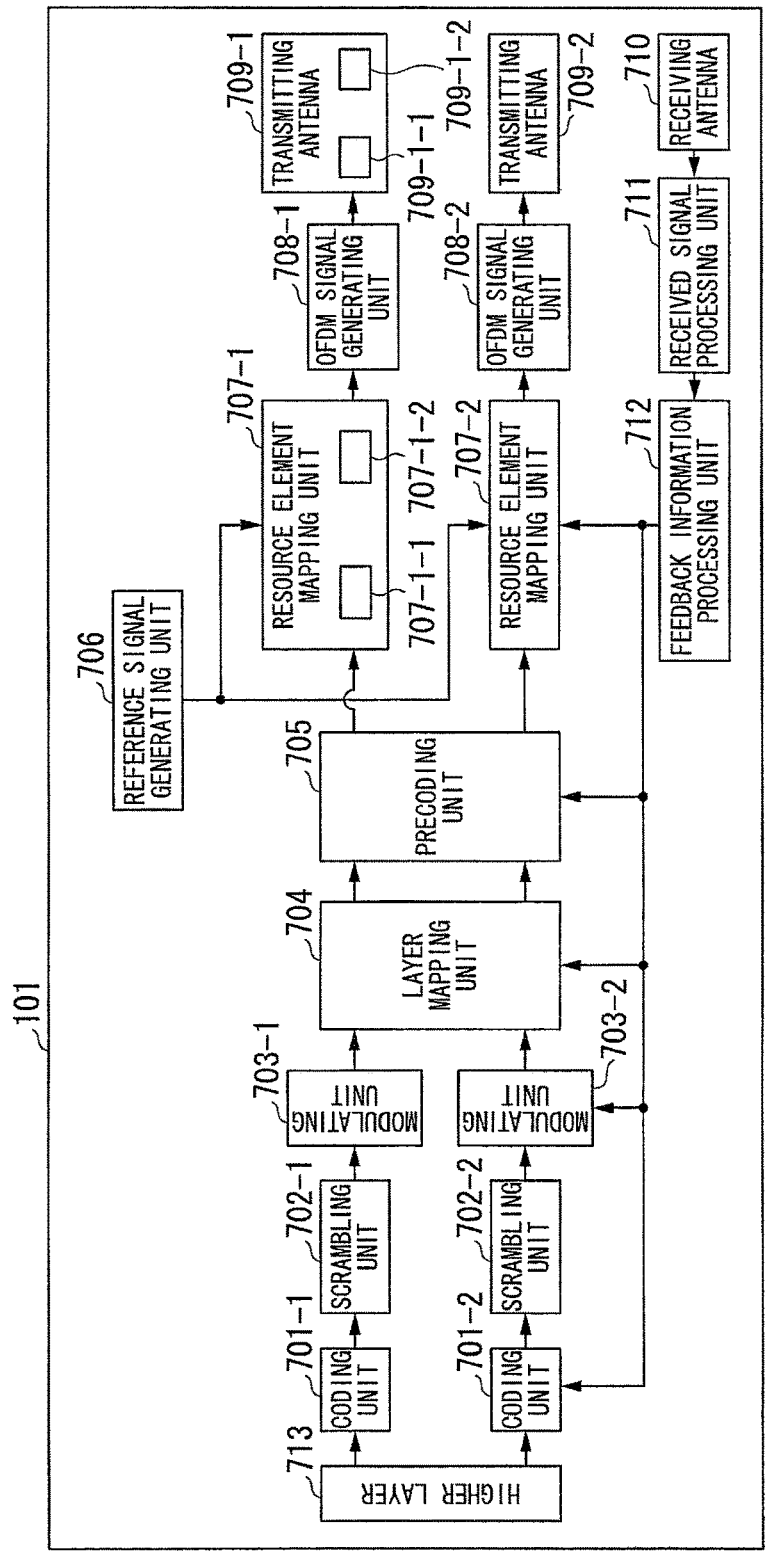
FIG. 7 is a simplified block diagram showing an example of the configuration of a base station (transmitter apparatus) in the same embodiment.

FIG. 7 is a simplified block diagram showing an example of the configuration of the base station (transmitter apparatus) 101 in the present embodiment. Because the configurations of the base station 102 and the base station 201 are the same as that of the base station 101, the description thereof will be omitted herein.

The base station 101 includes coding units 701-1 and 701-2, scrambling units 702-1 and 702-2, modulating units 703-1 and 703-2, a layer mapping unit 704, a precoding unit 705, a reference signal generating unit 706, resource element mapping units 707-1 and 707-2, OFDM signal generating units 708-1 and 708-2, transmitting antennas 709-1 and 709-2, a receiving antenna 710, a received signal processing unit 711, a feedback information processing unit 712, and a higher-layer 713.

The higher layer 713 outputs the transmitted data (bit stream) for the number of code words for each code word to the coding units 701-1 and 701-2. The coding units 701-1 and 701-2, based on the coding rate output by the feedback information processing unit 712, performs error correction coding and rate mapping processing with respect to the signal output by the higher layer 713, and outputs the result to the scrambling units 702-1 and 702-2. The scrambling units 702-1 and 702-2 multiply the signal output by the coding units 701-1 and 701-2 by a scrambling code, and output the result to the modulating units 703-1 and 703-2. The modulating units 703-1 and 703-2, based on the modulation method output by the feedback information processing unit 712, performs modulation processing of the signal output by the scrambling units 702-1 and 702-2 for PSK (phase-shift keying) modulation or QAM (quadrature amplitude modulation) or the like and outputs the result to the layer mapping unit 704.

The layer mapping unit 704, based on the mapping scheme output by the feedback information processing unit 712, distributes the modulation symbol stream output from the modulating units 703-1 and 703-2 to each layer, and outputs the signals for the number of layers to the precoding unit 705. The precoding unit 705, based on the precoding matrix output by the feedback information processing unit 712, performs precoding processing of the modulation symbol stream for each layer output by the layer mapping unit 704, and outputs the result to the resource element mapping units 707-1 and 707-2. More specifically, the precoding unit 705 multiplies the modulation symbol stream for each layer output by the layer mapping unit 704 by the precoding matrix.

The reference signal generating unit 706 generates a reference signal for MIMO and for CoMP, and outputs the result to the resource element mapping units 707-1 and 707-2. In this case, because the reference signal generating unit 706 uses the same stream to generate the MIMO reference signals and the CoMP reference signals, it is possible to reduce the size of the circuitry and the amount of processing required to generate the reference signals. For example, the reference signal generating unit 706 can use a stream generated in accordance with the cell ID for both the MIMO reference signals and the CoMP reference signals. Alternatively, the reference signal generating unit 706 may perform generation so that the streams used in generating the MIMO reference signals and the CoMP reference signals differ. By performing generation so that the streams used in generating the MIMO reference signals and the CoMP reference signals differ, it is possible to reduce the interference, even in the case in which both the MIMO reference signals and the CoMP reference signals between different cells are transmitted using the same resource.

The resource element mapping units 707-1 and 707-2, based on the modulation symbol mapping scheme output by the feedback information processing unit 712, map the modulation symbol stream precoded in the precoding unit 705 and the reference signal generated by the reference signal generating unit 706 onto the prescribed resource elements, and output signals for the number of transmitting antennas to the OFDM signal generating units 708-1 and 708-2. In this case, the positions of resource elements onto which CoMP reference signals are mapped in each cell performing CoMP are shared beforehand between cells (between base stations). The resource element mapping units 707-1 and 707-2 do not map modulation symbols onto resource elements of the local cell that correspond to the resource element onto which the CoMP reference signals are mapped in the cells performing CoMP.

The OFDM signal generating units 708-1 and 708-2 convert the group of resource blocks output from the resource element mapping units 707-1 and 707-2 to OFDM signals and output the results to the transmitting antennas 709-1 and 709-2. The transmitting antennas 709-1 and 709-2 transmit the signals output by the OFDM signal generating units 708-1 and 708-2 as downlink transmitted signals to the terminal device 104 or the like, from the transmitting antennas 709-1 and 709-2.

The receiving antenna 710 receives the uplink received signal from the terminal device 104 or the like and outputs it to the received signal processing unit 711. The received signal processing unit 711, after performing prescribed processing of the signal output from the receiving antenna 710, outputs the result to the feedback information processing unit 712 as feedback information. The feedback information processing unit 712, using the feedback information reported from the terminal device performing MIMO communication, changes items such as the coding rate in the coding units 701-1 and 701-2, the modulation method in the modulating units 703-1 and 703-2, the mapping scheme in the layer mapping unit 704, the precoding matrix in the precoding unit 705, and the modulation symbol mapping scheme in the resource element mapping units 707-1 and 707-2 and outputs the result to various units.

The feedback information processing unit 712, rather than just using the feedback information reported from a terminal device performing CoMP communication to change the items such as the coding rate in the coding units 701-1 and 701-2, the modulation method in the modulating units 703-1 and 703-2, the mapping scheme in the layer mapping unit 704, the precoding matrix in the precoding unit 705, and the modulation symbol mapping scheme in the resource element mapping units, also generates and sends to various units information shared between cells for performing CoMP (such as scheduling information and precoding information) based on the feedback information.

Figure 8:
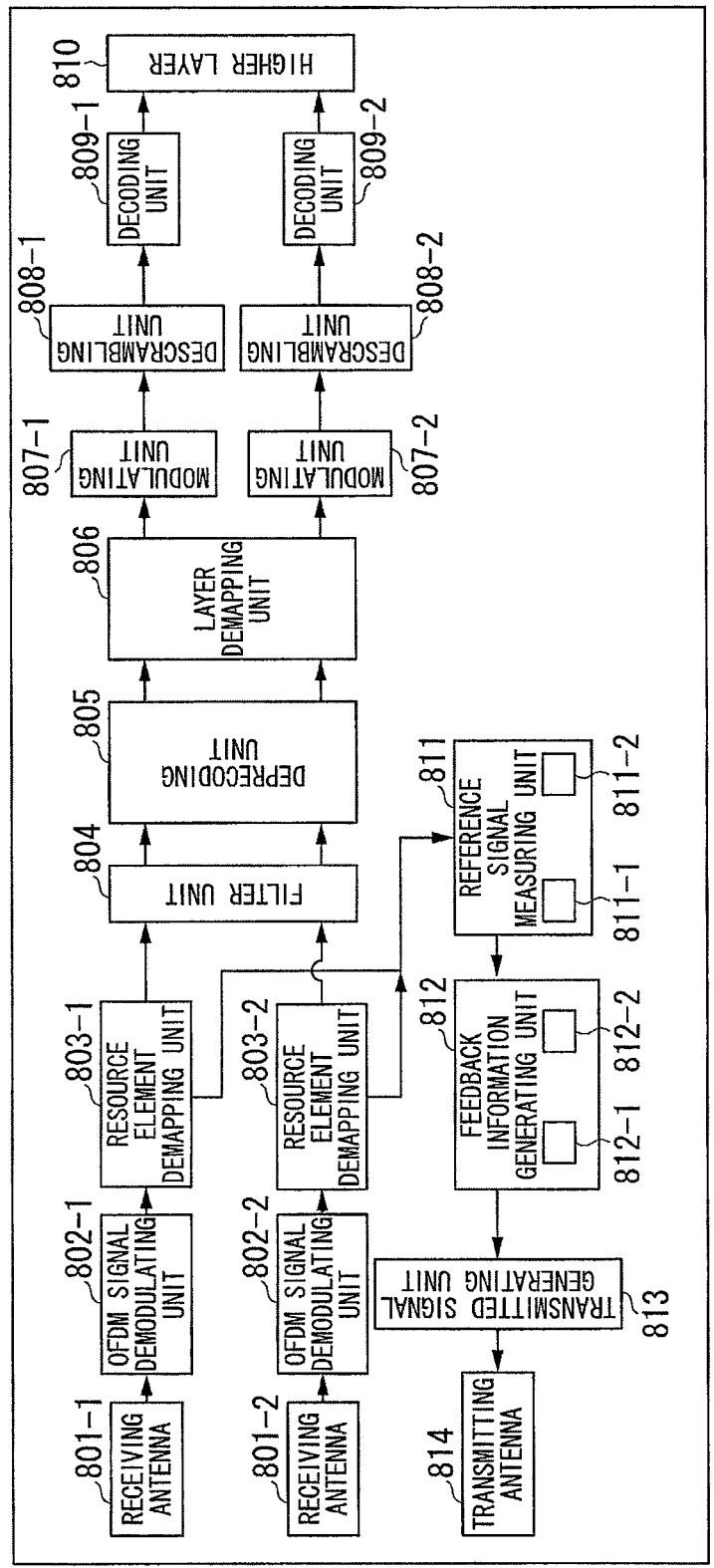
FIG. 8 is a simplified block diagram showing an example of the configuration of the terminal device (receiver apparatus) in the same embodiment.

FIG. 8 is a simplified block diagram showing an example of the configuration of a terminal device 104 (receiver apparatus) in the present embodiment. Because the configuration of the terminal device 103 is the same as that of the terminal device 104, its description will be omitted herein.

The terminal device 104 has receiving antennas 801-1 and 801-2, OFDM signal demodulating units 802-1 and 802-2, resource element demapping units 803-1 and 803-2, a filter unit 804, a precoding unit 805, a layer demapping unit 806, demodulating units 807-1 and 807-2, descrambling units 808-1 and 808-2, decoding units 809-1 and 809-2, a higher layer 810, a reference signal measuring unit 811, a feedback information generating unit 812, a transmitted signal generating unit 813, and a transmitting antenna 814.

The receiving antennas 801-1 and 801-2 receive the downlink received signals transmitted by the base station 101 or the like and output the signals from the number of receiving antennas to the OFDM signal demodulating units 802-1 and 802-2. The OFDM signal demodulating units 802-1 and 802-2 perform OFDM demodulation processing of the signals output by the receiving antennas 801-1 and 801-2, and output signals for a resource block group to the resource element demapping units 803-1 and 803-2.

The resource element demapping units 803-1 and 803-2 obtain the reference signals from the resource elements at the positions notified from the base station in step S602 and step S607 in FIG. 6, and output them to the reference signal measurement unit 811. The resource element demapping units 803-1 and 803-2 output the received signals from resource elements onto which reference signals are not mapped to the filter unit 804. In the case in which the terminal device 104 performs CoMP, the terminal device 104 is notified in step S607 in FIG. 6 from the base station 101 of the position of a resource element onto which a CoMP reference signal is mapped in another cooperating cell.

In the resource element of the local cell that corresponds to this resource element, modulating symbol puncturing is performed in the resource element mapping units 707-1 and 707-2. For this reason, the resource element demapping units 803-1 and 803-2 may make output to the filter unit 804 after destruction and/or depuncturing of the received signal. By doing this, it is possible to reduce interference and noise, and possible to improve the quality of received data.

The filter unit 804 performs filtering processing with respect to the received signals output from the resource element demapping units 803-1 and 803-2, and outputs the results to the deprecoding unit 805. The deprecoding unit 805 performs deprecoding processing with respect to the signal that was filtered by the filter unit 804, this corresponding to the precoding done by the precoding unit 705, and outputs signals for the number of layers to the layer demapping unit 806. The layer demapping unit 806 performs joining processing with respect to the signal output by the deprecoding unit 805, this corresponding to the layer mapping unit 704, converts the signals for each layer to signals for each code word, and outputs the result to the demodulating units 807-1 and 807-2.

The demodulating units 807-1 and 807-2 perform demodulation processing with respect to the signals for each code word converted by the layer demapping unit 806, this corresponding to the modulation processing in the modulating units 703-1 and 703-2, and output the results to the descrambling units 808-1 and 808-2. The descrambling units 808-1 and 808-2 multiply the signals output by the demodulating units 807-1 and 807-2 by the conjugate code of the scrambling code used in the scrambling units 702-1 and 702-2 (divided by the scrambling code), and output the results to the decoding units 809-1 and 809-2. The decoding units 809-1 and 809-2 perform rate demapping processing and error correction decoding processing with respect to the signals output by the descrambling units 808-1 and 808-2, obtain received data for each code word, and output signals for the number of code words to the higher layer 810.

In this case, in the filtering processing performed by the filter unit 804, the transmitted signals of each of the transmitting antennas 709-1 and 709-2 in FIG. 7 are detected from the received signals for each of the receiving antennas 801-1 and 801-2, using a method such as ZF (zero forcing), MMSE (minimum mean square error), or MLD (maximum likelihood detection). It is possible, by referencing a known signal precoded in the same manner as data, perform processing at the filter unit 804 and processing at the deprecoding unit 805 simultaneously when detecting the transmitted signals of each layer.

The reference signal measuring unit 811 measures the reference signals acquired by the resource element demapping units 803-1 and 803-2, and outputs the measurement results to the feedback information generating unit 812. In the case in which the terminal device 104 is performing MIMO communication, the feedback information generating unit 812 generates the above-described MIMO feedback information, and outputs it to the transmitted signal generating unit 813. In the case in which the terminal device 104 is performing CoMP communication, the feedback information generating unit 812 generates the above-described CoMP feedback information and outputs it to the transmitted signal generating unit 813.

The transmitted signal generating unit 813 converts the feedback information generated by the feedback information generating unit 812 to a transmitted signal, and outputs the result to the transmitting antenna 814. The transmitting antenna 814 transmits the signal output by the transmitted signal generating unit 813 to the base station 101 as the uplink transmitted signal.

In this manner, for the first reference signal that is referenced by a terminal device that does not perform CoMP, puncturing is not done by the base station. In contrast, the base station does do puncturing in the case of a second reference signal that is referenced by a terminal device performing CoMP, and places the first and second reference signals in different subframes. By doing this, the terminal device can generate the feedback information with high accuracy. When transitioning to the MIMO mode, notification is made by the base station to the terminal device of the positions of the first reference signals. When transitioning to the CoMP mode, notification is made by the base station to the terminal device of the position of the second reference signal. By doing this, efficient placement of reference signals and signaling are possible for feedback.

The resource element mapping unit 707-1 of the base station 101, which is a transmitter apparatus, functions as the first mapping unit 707-1-1 and the second mapping unit 707-1-2. The resource element mapping unit 707-2, similarly, functions as the resource element mapping unit 707-1.

The transmitting antenna 709-1 of the base station 101 functions as the reference signal transmitting unit 709-1-1 and the notifying unit 709-1-2. The transmitting antenna 709-2, similarly, functions as the transmitting antenna 709-1.

In the base station 101, the reference signal transmitting unit 709-1-1 transmits both the first reference signal and a second reference signal, that is different from the first reference signal, to both the first receiver apparatus that performs non-cooperative communication (for example, the terminal device 104) and a second receiver apparatus that performs cooperative communication (for example, the terminal device 103), respectively.

In the base station 101, the notifying unit 709-1-2 instructs the first receiver apparatus to measure the first reference signal, and instructs the second receiver apparatus to measure the second reference signal.

In the base station 101, the first mapping unit 707-1-1 may map the first reference signal and the second reference signal onto different resources.

In the base station 101, the first mapping unit 707-1-1 may use the same stream as both the first reference signal and the second reference signal.

In the base station 101, the second mapping unit 707-1-2 may place the first reference signal and the second reference signal in different subframes.

In the base station 101, the reference signal transmitting unit 709-1-1 may transmit both the first reference signal and the second reference signal that differs from the first reference signal to a first receiver apparatus (for example, the terminal device 104) that performs non-cooperative communication and a second receiver apparatus (for example, the terminal device 103) that performs cooperative communication.

The notifying unit 709-1-2 may notify the first receiver apparatus of information that specifies the position of the first reference signal, and notify the second receiver apparatus of information that specifies the position of the second reference signal.

The reference signal measuring unit 811 of the terminal device 104, which is a receiver apparatus, functions as a first reference signal measuring unit 811-1 and a second reference signal measuring unit 811-2.

The feedback information generating unit 812 of the terminal device 104 functions as the first feedback information generating unit 812-1 and the second feedback information generating unit 812-2.

In the terminal device 104, the first reference signal measuring unit 811-1 measures the first reference signal that differs from the first reference signal, based on the instruction to measure the first reference signal from the transmitter apparatus that switches between non-cooperative communication and cooperative communication.

In the terminal device 104, the second reference signal measuring unit 811-2 measures the second reference signal, based on the instruction to measure the second reference signal from the transmitter apparatus.

In the terminal device 104, the first feedback information generating unit 812-1 may use the first reference signal measurement results to generate first feedback information, and the second feedback information generating unit 812-2 using the second reference signal measurement results to generate second feedback information that differs from the first feedback information.

Second Embodiment

In the first embodiment, the description is for the case in which the subframes in which CoMP reference signals are placed are synchronized (placed at the same time) between cells capable of CoMP. In the second embodiment of the present invention, the case in which the CoMP reference signals are placed in different subframes between cells capable of CoMP will be described.

Because the base station and terminal device configurations in the second embodiment are the same as those of the base station (FIG. 7) and the terminal device (FIG. 8) in the first embodiment, their descriptions will be omitted herein.

The present embodiment will be described below, with references made to the drawings.

Figure 9A:
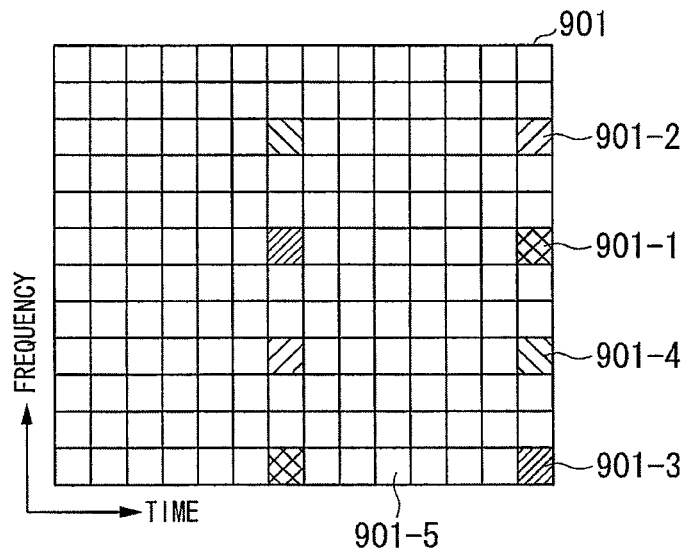
FIG. 9A is a drawing showing an example of the configuration of the reference signal in a second embodiment of the present invention.
Figure 9B:
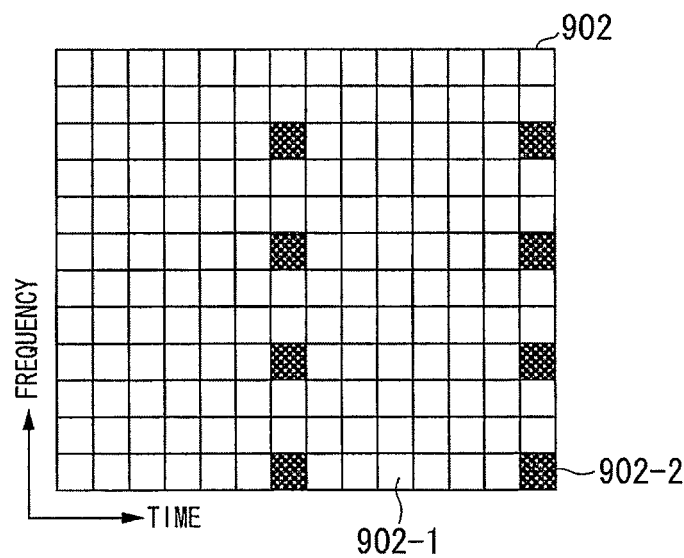
FIG. 9B is a drawing showing another example of the configuration of the reference signal in the second embodiment of the present invention.
Figure 9C:
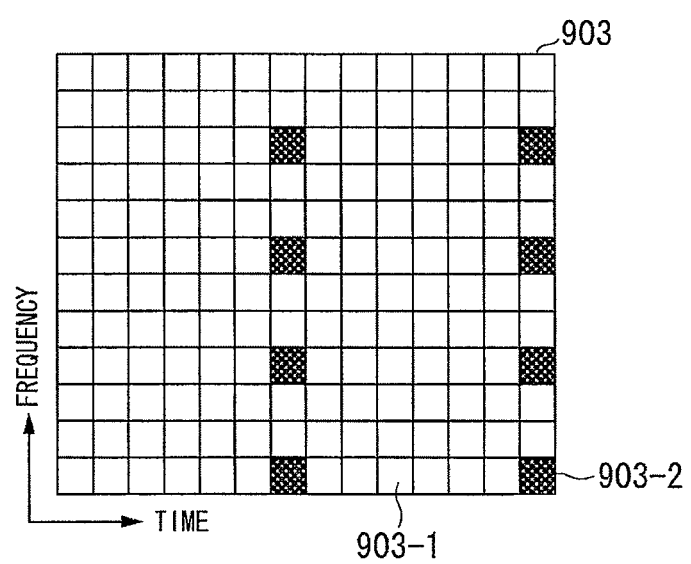
FIG. 9C is a drawing showing yet another example of the configuration of the reference signal in the second embodiment of the present invention.

FIG. 9A to FIG. 9C are drawings showing examples of the configuration of the reference signal that are referenced by the terminal device that performs CoMP. In FIG. 9A to FIG. 9C, the horizontal axis represents time and the vertical axis represents frequency. In the present embodiment, the description is for a cell configuration that is similar to that shown in FIG. 1 and FIG. 2.

The resource block 901 shown in FIG. 9A is transmitted from the base station 101 that covers the cell #1, and at the cell #1 there is transmission from each cell at the same time as a resource block that includes a CoMP reference signal. The resource block 902 shown in FIG. 9B is transmitted from the base station 102 that covers the cell #2, this being a resource block that is transmitted from each cell at the same time as the resource block that includes the CoMP reference signal at the cell #1. The resource block 903 shown in FIG. 9C is transmitted from the base station 201 that covers the cell #3, being a resource block that is transmitted from each cell at the same time as the resource block that includes the CoMP reference signal at the cell #1.

The resource elements 901-1 to 901-4 within the resource block 901 are resource elements onto which LTE-A reference signals are mapped. The other resource element 901-5 is a resource element onto which a signal other than an LTE-A reference signal (that is, a data signal, a control signal, an LTE control signal, a reference signal for modulation, or the like) is mapped. The resource element 902-2 is a resource element at the cell #2 having the same frequency and the same time as the resource element with which the CoMP reference signal is transmitted from the cell #1, in which the modulation symbols are punctured. What is shown is the case in which transmission is made at the same frequency and time as the resource block 902 and also in which the CoMP reference signal is placed only at the cell #1. If a CoMP reference signal is placed at another cell, puncturing is done even at the resource element at the cell #2 at the same frequency and same time as the resource element onto which the reference signal of that cell is mapped. The same applies to the resource elements 903-1 and 903-2 within the resource block 903 at the cell #3 as with respect to the cell #2.

An example of the method of measuring the quality of receiving by the terminal device 104 in FIG. 1 will now be described. The terminal device 104, which performs CoMP with the base station 101 that covers the cell #1 and the base station 102 that covers the cell #2 synthesizes the received signal at the resource elements 901-1 to 901-4 onto which the reference signals transmitted from the base station 101 are mapped for each port. By doing this, the terminal device 104 generates replicas of the received signals from the base station 101. In this case, the cell #2 and the cell #3 do signal puncturing at the same time and same frequency resources as the resource elements 901-1 to 901-4 (for example, the resource elements 902-2 and 903-2).

For this reason, the replicas of received signals from the base station 101 are not interfered with by the signal at the cell #2 and the signal at the cell #3, it is possible to measure with accuracy. From the obtained replicas of received signals from the base station 101, the terminal device 104 generates feedback information (CSI (channel state information)), information that indicates a channel matrix, or information for a processed channel matrix. In this manner, the terminal device 104 measures the resource elements 901-1 to 901-4 at the cell #1, which is a cell that performs CoMP with the terminal device 104, so that it is possible to generate the feedback information with good accuracy (with little influence from interference).

FIG. 10 is a drawing showing an example of the configuration of wireless frames transmitted from the base station 101, the base station 102, and the base station 201. In FIG. 10, the horizontal axis indicates time. The wireless frame 1001 shown as signal 1 in FIG. 10 is transmitted from the base station 101 that covers the cell #1. The wireless frame 1002 shown as signal 2 in FIG. 10 is transmitted from the base station 102 that covers the cell #2. The wireless frame 1003 shown as signal 3 in FIG. 10 is transmitted from the base station 201 that covers the cell #3. Each of the wireless frames 1001, 1002, and 1003 includes, respectively, the 10 subframes SF#0 to SF#9. This drawing shows the case in which wireless frames are synchronized between cells.

The subframes 1001-2, 1002-2, and 1003-2 are subframes in which MIMO reference signals for MIMO communication in the cell #1, the cell #2 and the cell #3 are placed. The subframes 1001-2, 1002-2, and 1003-2 can be subframes in which MIMO reference signals are placed, similar to FIG. 3A to FIG. 3C. The subframes 1001-3, 1002-3, and 1003-3 are subframes in which CoMP reference signals in the cell #1, the cell #2, and the cell #3 are placed.

The subframes 1001-4, 1002-4, and 1003-4 are each subframes in which puncturing is done in the resource elements onto which CoMP reference signals in any of the cell #1, the cell #2, and the cell #3 are mapped. For example, in the subframe SF#6, it is possible to use the reference signals placement shown in FIG. 9A to FIG. 9C. The other subframes, 1001-1, 1002-1 and 1003-1 are normal subframes (subframes in which a reference signal is not placed or subframes that do not perform puncturing).

As described above, the terminal device 104 in FIG. 1 can measure the CoMP reference signal at the cell #1 in subframe SF#6 with high accuracy. In the same manner, the terminal device 104 can measure the CoMP reference signals at the cell #2 in the subframe SF#7 with high accuracy. In this manner, the terminal device 104 can generate each feedback information with good accuracy (with little influence from interference), and report these separately to the base stations. By doing this, because the feedback information is temporally dispersed, it is possible to improve the feedback efficiency.

Alternatively, the terminal device 104 can store each of the accurate measurement results (with little influence from interference) and generate feedback information from the measurement results of a plurality of cells (for example, the cell #1 and the cell #2), and report the result to the base station. In this case, the terminal device 104 can not only generate, as the feedback information, CSI (information indicating the channel matrix or the processed channel matrix), but also can generate CQI/PMI/RI, thereby enabling generating of high-accuracy feedback information that takes the performance of the terminal device into consideration.

In this manner, the base station does not perform puncturing for the first reference signal that is referenced by a terminal device that does not perform CoMP. In contrast, the base station performs puncturing for the second reference signal that is referenced by a terminal device that performs CoMP, and places the first reference signal and the second reference signal into different subframes. By doing this, the terminal device can generate highly accurate feedback information.

Third Embodiment

In the first embodiment, the description is for the case in which notification is made of the position of the first reference signal when transitioning to the MIMO mode, and notification is made of the position of the second reference signal when transitioning to the CoMP mode. In the third embodiment, the description will be for the case in which the position of the first reference signal is notified to the terminal device from the base station, and notification is made of the position of the second reference signal to the terminal device from the base station when transitioning to the CoMP mode.

Because the configurations of the base station and the terminal device in the third embodiment are the same as the base station (FIG. 7) and the terminal device (FIG. 8) in the first embodiment, detailed descriptions thereof will be omitted herein.

Figure 11:
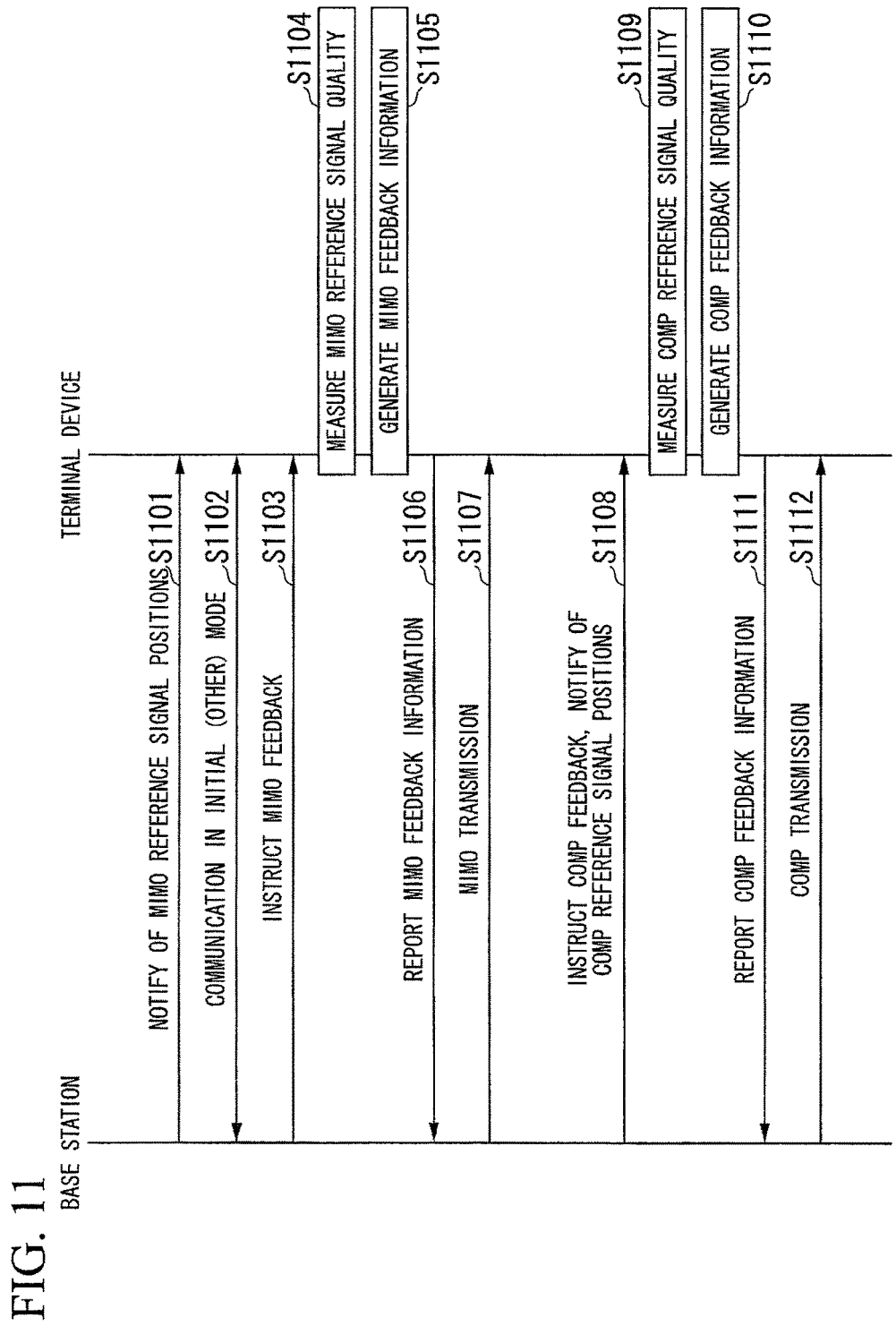
FIG. 11 is a sequence diagram showing an example of the processing between the base station (transmitter apparatus) and the terminal device (receiver apparatus) in a third embodiment of the present invention.

The present embodiment is described below, with references made to FIG. 11. FIG. 11 is a sequence diagram showing an example of the processing between the base station 101 (transmitter apparatus, housing base station, Serving Cell) and the terminal device in the present embodiment.

First, the base station notifies the terminal device of information indicating the position of the MIMO reference signal. The terminal device receives this information (step S1101). The base station and the terminal device communicate in the transmitting mode that is neither the initial mode (TxD mode or the like) or the MIMO mode (step S1102). In this case, the MIMO reference signal positions may be notified by the numbers of the subframes in which the MIMO reference signals have been placed from the base station to the terminal device, or be obtainable as subframes numbers in which placement was made, from a prescribed index of which notification is made and from another parameter (for example, cell ID or the like) at the terminal device side. Additionally, it is possible to give notification of not only the subframe numbers, but also information regarding the position of the resource elements (OFDM symbol number, resource block number, subcarrier number, frequency offset value, or a index that is specified using a lookup table of combination of these) from the base station to the terminal device.

In the case of transition to the MIMO mode, the base station instructs the terminal device regarding the feedback for MIMO (step S1103). In this case, by the MIMO feedback instruction, the feedback method may be specified regardless of explicit/implicit, or the MIMO mode itself may be specified.

Upon receiving the MIMO feedback instruction from the base station, the terminal device uses the position information of the MIMO reference signals of which notification was made to measure the quality of the MIMO reference signals (step S1104). The terminal device, based on the measurement results at step S1104, generates MIMO feedback information (step S1105). The terminal device reports the MIMO feedback information generated at step S1105 to the base station (step S1106). The base station determines the MIMO transmission parameters, referring to the feedback information, and performs MIMO transmission with respect to the terminal device (step S1107). During the MIMO communication, the processing of step S1104 to step S1107 is repeatedly performed.

In the case of transitioning from the MIMO mode to the CoMP mode, the base station instructs the CoMP feedback to the terminal device, and gives notification of the CoMP reference signal position (for example, signaling using the physical control channel (PDCCH) or higher-layer signaling (RRC signaling)) (step S1108). In this case, the feedback method may be specified regardless of implicit/explicit, or the CoMP mode itself may be specified. By making the setting such that the notification of the CoMP reference signal positions is the trigger for the CoMP feedback, the notification itself of the CoMP reference signal positions can be the CoMP feedback instruction.

The numbers of the subframes in which the CoMP reference signals are placed in the local cell and another cell that has the possibility of performing CoMP may be notified as the CoMP reference signal positions, or being obtainable as subframe numbers in which placement was made, from a prescribed index of which notification is made and from another parameter (for example, cell ID or the like) at the terminal device side. Additionally, it is possible for base station to notify the terminal device of not only the subframe numbers, but also information regarding the resource element positions (the OFDM symbol number, resource block number, subcarrier number, frequency offset value, or an index that is specified by a lookup table of a combination thereof).

The CoMP feedback instruction and the other cell that specify the CoMP reference signal positions are not necessarily associated with one another. For example, cells specifying the CoMP reference signal positions (local cells or other cells) may be a set of cells for measurement of the reference signals, a set of cells for generation of feedback information may be a subset of the set of cells for measurement of the reference signals.

The terminal device measures the quality of the CoMP reference signals of the local cells and/or other cells (step S1109). The terminal device, based on the measurement results, generates CoMP feedback information (step S1110). The terminal device reports the generated CoMP feedback information to the base station (step S1111). The base station determines the CoMP transmission parameters, referencing the feedback information, and performs CoMP transmission to a terminal device, cooperating with another base station (step S1112). During the CoMP communication, the processing of step S1109 to step S1110 is repeatedly performed. As necessary, the CoMP reference signal positions (the CoMP reference signal positions in another cell having the possibility of performing CoMP) may be notified to the terminal device from the base station.

The positions of the reference signals for MIMO, which is a basic transmission mode, are notified by the base station to the terminal device beforehand, and when the transmission mode is switched, notification is made of the feedback method instruction. Also, when switching to the CoMP mode, notification is made of the CoMP reference signal positions from the base station to the terminal device. By doing this, it is possible to improve the efficiency of feedback-related signaling. By associating the feedback method instruction with the reference signal position notification, it is possible to reduce the overhead in signaling.

By the base station notifying terminal device of the MIMO reference signal position, it is possible to acquire and use the MIMO reference signal even at a terminal device which has transitioned to the CoMP mode. For example, a terminal device in the CoMP mode also can measure the MIMO reference signal and calculate the SINR assuming MIMO transmission. By further reporting this feedback information based on this SINR to the base station, it is possible to make a smooth transition from the CoMP mode to the MIMO mode, or to dynamically switch between the CoMP mode and the MIMO mode. The transfer rate based on the SINR calculated by the terminal device can be compared with the transfer rate during the CoMP mode, to enable reporting by the terminal device to the base station as to which of the transmission modes is preferable. Because this enables a smooth transition from the CoMP mode to the MIMO mode or dynamic switching between the CoMP mode and the MIMO mode, efficient use of bandwidth is possible.

Fourth Embodiment

In the first embodiment, the description was for the case in which notification is made of the first reference signal position by the base station to the terminal device at the time of transition to the MIMO mode, and notification is made of the second reference signal position by the station to the terminal device at the time of transition to the CoMP mode. In the fourth embodiment of the present invention, the case described is that in which the first reference signal position and the second reference signal position are notified from the base station to the terminal device, with MIMO or CoMP feedback instruction being made at the time of a transition to the MIMO mode or the CoMP mode.

Because the configurations of the base station and the terminal device in the fourth embodiment are the same as the base station (FIG. 7) and the terminal device (FIG. 8) in the first embodiment, detailed descriptions thereof will be omitted herein.

Figure 12:
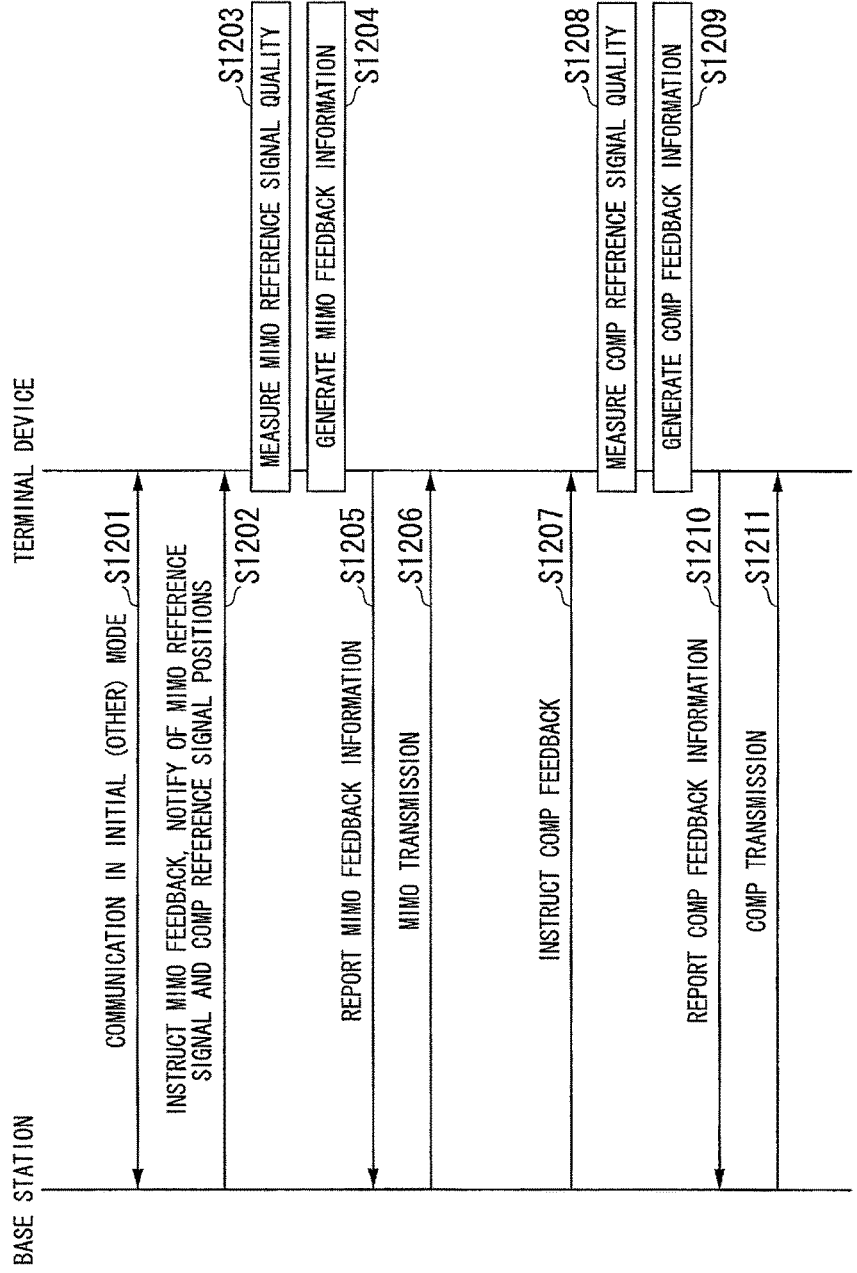
FIG. 12 is a sequence diagram showing an example of the processing between the base station (transmitter apparatus) and the terminal device (receiver apparatus) in a fourth embodiment of the present invention.

The present embodiment is described below, with references made to FIG. 12. FIG. 12 is a sequence diagram showing an example of the processing between a base station 101 (transmitter apparatus, housing base station, Serving Cell) and a terminal device in the present embodiment.

First, the base station and the terminal device perform communication in a transmission mode that is neither the initial mode (TxD mode or the like) or the MIMO mode or CoMP mode (step S1201).

In the case of transition to the MIMO mode, the base station makes notification to the terminal device of the MIMO reference signal (first reference signal) positions and the CoMP reference signal (second reference signal) positions. The base station gives a MIMO feedback instruction to the terminal device (step S1202). In this case, although the description is for the case of the notification of the first reference signal position and the second reference signal position at the time of transition to the MIMO mode (step S1202), this is not a restriction, and notification prior thereto may be given. For example, it is possible to use a method such as signaling in a random access protocol or synchronized handover.

The terminal device that has received the MIMO feedback instruction from the base station uses the notified MIMO reference signal position information to measure the quality of the MIMO reference signal (step S1203). The terminal device, based on the measurement results at step S1203, generates MIMO feedback information (step S1204). The terminal device reports the MIMO feedback information that is generated at step S1204 to the base station (step S1205). The base station determines the MIMO transmission parameters, referencing the feedback information, and performs MIMO transmission to the terminal device (step S1206). During the MIMO communication, the processing of step S1203 to step S1206 is repeatedly performed.

In the case of a transition from the MIMO mode to the CoMP mode, the base station gives a CoMP feedback instruction to the terminal device (step S1207).

The terminal device measures the quality of the CoMP reference signals of a local cell and/or another cell (step S1208). The terminal device, based on the measurement results at step S1208, generates CoMP feedback information (step S1209). The terminal device reports the CoMP feedback information generated at step S1209 to the base station (step S1210). The base station determines the CoMP transmission parameters, referencing the feedback information, and perform CoMP transmission to the terminal device, cooperating with another base station (step S1211). During the CoMP communication, the processing of step S1208 to step S1211 is repeatedly performed. As necessary, the CoMP reference signal positions (the CoMP reference signal positions in another cell having the possibility of performing CoMP) may be notified to the terminal device from the base station.

The positions of the MIMO reference signals and the positions of the CoMP reference signal are notified by the base station to the terminal device beforehand, and when the transmission mode is switched, notification is made of the feedback method instruction. By doing this, it is possible to improve the efficiency of feedback-related signaling.

By the base station notifying the terminal device of the MIMO reference signal positions and the CoMP reference signal positions beforehand, it is possible to acquire and use the MIMO reference signals at even the terminal device that has transitioned to the CoMP mode. For example, a terminal device in the CoMP mode also can measure the MIMO reference signals and calculate the SINR assuming MIMO transmission. By further reporting of this feedback information based on SINR by the terminal device to the base station, it is possible to make a smooth transition from the CoMP mode to the MIMO mode, or to switch between the CoMP mode and the MIMO mode dynamically.

The transfer rate based on the SINR calculated by the terminal device can be compared with the transfer rate during the CoMP mode, to enable reporting by the terminal device to the base station as to which of the transmission mode is preferable. Because this enables a smooth transition from the CoMP mode to the MIMO mode or dynamic switching between the CoMP mode and the MIMO mode, efficient use of bandwidth is possible. In the reverse case, in the terminal device in which transition has been made to the MIMO mode, it is possible to acquire and use the CoMP reference signals. For example, a terminal device in the MIMO can also measure the CoMP reference signals and calculate the SINR with high accuracy. Alternatively, because the position of modulation symbols punctured at the local cell can be known by terminal device, it is possible to perform data demodulation and decoding that takes this into consideration.

In this embodiment as well, it is possible to use the same information as the reference signal position information as in the first to third embodiments. With regard to the notification of the reference signal positions as well, it is possible to use signaling that is the same as in the first to third embodiments. In the present embodiment as well, there is no restriction to an association between the CoMP feedback instruction and the other cell that specifies the CoMP reference signal positions.

Fifth Embodiment

In the first embodiment, the description was for the case in which notification is made of the first reference signal position at the time of transition to the MIMO mode, and notification is made of the second reference signal position at the time of transition to the CoMP mode. In the fifth embodiment of the present invention, the description is for the case in which the first and second reference signal positions are first reported, and then instruction is given for either MIMO or CoMP feedback when a transition is made to either the MIMO mode or the CoMP mode.

Because the configurations of the base station and the terminal device in the fifth embodiment are the same as the base station (FIG. 7) and the terminal device (FIG. 8) in the first embodiment, detailed descriptions thereof will be omitted herein.

Figure 13:
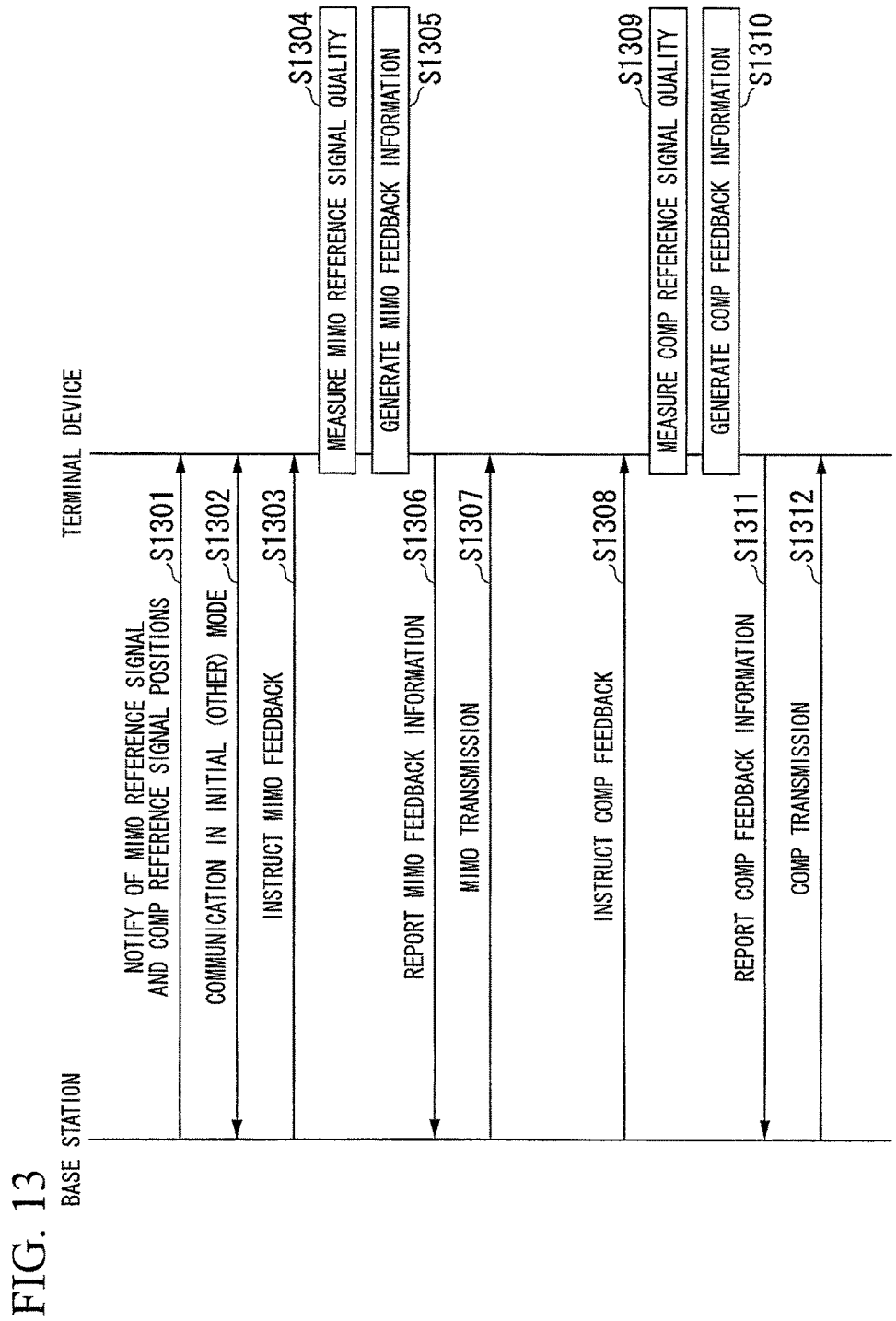
FIG. 13 is a sequence diagram showing an example of the processing between the base station (transmitter apparatus) and the terminal device (receiver apparatus) in a fifth embodiment of the present invention.

The present embodiment is described below, with references made to FIG. 13. FIG. 13 is a sequence diagram showing an example of the processing between a base station 101 (transmitter apparatus, housing base station, Serving Cell) and a terminal device in the present embodiment.

The base station makes a notification to the terminal device of the positions of the MIMO reference signals (first reference signal) and the position of the CoMP reference signals (second reference signal) (step S1301).

The base station and the terminal device are communicating in a transmission mode that is neither the initial mode (TxD mode or the like) or the MIMO or CoMP mode (step S1302).

In the case of transition to the MIMO mode, the base station instructs the MIMO feedback to the terminal device (step S1303).

The terminal device that has received the MIMO feedback instruction from the base station uses the notified MIMO reference signal position information to measure the quality of the MIMO reference signal (step S1304). The terminal device, based on the measurement results of step S1304, generates MIMO feedback information (step S1304). The terminal device reports the MIMO feedback information generated at step S1304 to the base station (step 1306). The base station references the feedback information and determines the MIMO transmission parameters, and performs MIMO transmission to the terminal device (step S1307). During the MIMO communication, the processing of step S1304 to step S1307 is repeatedly performed.

In the case of transition from the MIMO mode to the CoMP mode, the base station instructs the CoMP feedback to the terminal device (step S1308).

The terminal device measures the quality of the CoMP reference signals of the local cell and/or another cell (step S1309). The terminal device, based on the measurement results at step S1309, generates CoMP feedback information (step S1310). The terminal device reports the CoMP feedback information generated at step S1310 to the base station (step S1311). The base station references the feedback information to determine the CoMP transmission parameters and performs CoMP transmission to the terminal device, cooperating with another base station (step S1312). During the CoMP communication, the processing of step S1309 to step 1312 is repeatedly performed.

When the MIMO reference signal positions and the CoMP reference signal positions are notified from the base station to the terminal device beforehand and then the transmission mode is switched, notification is made of a feedback method instruction. By doing this, it is possible to improve the efficiency of feedback-related signaling.

When the MIMO reference signal position and the CoMP reference signal position are notified to the terminal device from the base station beforehand, even at a terminal device that has transitioned to the CoMP mode, it is possible to acquire and use the MIMO reference signals. For example, the CoMP mode terminal device also measures the MIMO reference signals and can calculate the SINR for the case of assuming MIMO transmission. By further reporting this feedback information based on SINR, it is possible to make a smooth transition from the CoMP mode to the MIMO mode, or to dynamically switch between the CoMP mode and the MIMO mode.

The transfer rate based on the SINR calculated by the terminal device can be compared with the transfer rate during the CoMP mode, to enable reporting to the base station as to which of the transmission modes is preferable. By doing this, it is possible to make a smooth transition from the CoMP mode to the MIMO mode or dynamically switch between the CoMP mode and the MIMO mode, thereby enabling efficient usage of frequency spectrum. In the reverse case, a terminal device that has transitioned to the MIMO mode can also acquire and use the CoMP reference signals. For example, the MIMO mode terminal device also can measure the CoMP reference signals and calculate the SINR with high accuracy. Alternatively, because the position of modulation symbols punctured at the local cell can be known, it is possible to perform data demodulation and decoding that takes this into consideration.

In this embodiment as well, it is possible to use the same information as the reference signal position information as in the first to third embodiments. In the present embodiment as well, there is no restriction to an association between the CoMP feedback instruction and the other cell that specifies the CoMP reference signal positions.

Sixth Embodiment

In the third embodiment, the description was for the case of a CoMP mode terminal device reporting CoMP feedback information a base station. In the sixth embodiment of the present invention, the description will be for the case in which a CoMP mode terminal device reports MIMO feedback in addition to CoMP feedback to the base station.

Because the configurations of the base station and the terminal device in the sixth embodiment are the same as the base station (FIG. 7) and the terminal device (FIG. 8) in the first embodiment, detailed descriptions thereof will be omitted herein.

The present embodiment will be described below, with references made to FIG. 14. FIG. 14 is a sequence diagram showing an example of the processing between a base station 101 (transmitter apparatus, housing base station, Serving Cell) and a terminal device in the present embodiment.

First, the base station notifies the terminal device of information indicating the MIMO reference signal position. The terminal device acquires this information from the base station (step S1401). The base station and the terminal device are communicating in a transmission mode that is neither the initial mode (TxD mode or the like) nor the MIMO mode (step S1402).

In the case of a transition to the MIMO mode, instruction is made of the MIMO feedback by the base station to the terminal device (step S1403).

The terminal device that has received an instruction of MIMO feedback from the base station uses the notified MIMO reference signal position information and measures the quality of the MIMO reference signal (step S1404). The terminal device, based on the measurement results at step S1404, generates MIMO feedback information (step S1405). The terminal device reports the MIMO feedback information generated at step S1405 to the base station (step S1406). The base station references the feedback information and determines the MIMO transmission parameters, and performs MIMO transmission to the terminal device (step S1407). During the MIMO communication, the processing of step S1404 to step S1407 is repeatedly performed.

In the case of a transition from the MIMO mode to the CoMP mode, the base station gives a CoMP feedback instruction to the terminal device and notifies it of the CoMP reference signal position (step S1408).

The terminal device measures the quality of the MIMO reference signal at the local cell (step S1409). The terminal device, based on the measurement results at step S1409, generates MIMO feedback information (step S1410). The terminal device also measures the quality of the CoMP reference signals at the local cell and/or another cell (step S1411). The terminal device, based on the measurement results at step S1411, generates CoMP feedback information (step S1412). The terminal device reports the MIMO feedback information generated at step S1412 and the CoMP feedback information to the base station (step S1413). The base station references the feedback information and determines the CoMP transmission parameters, and either performs CoMP transmission to the terminal device, cooperating with another base station, or determines the MIMO transmission parameters, referring to the MIMO feedback information, and performs MIMO transmission (step S1414).

The positions of the reference signals for MIMO, which is a basic transmission mode, are notified by the base station to the terminal device beforehand, and when the transmission mode is switched, notification is made of the feedback method instruction. Also, when switching to the CoMP mode, notification is made of the CoMP reference signal positions. By doing this, it is possible to improve the efficiency of feedback-related signaling. By associating the feedback method instruction with the reference signal position notification, it is possible to reduce the overhead in signaling.

By the terminal device notifying the base station of the MIMO feedback information and the CoMP feedback information, it is possible for the base station to switch between the CoMP mode and the MIMO mode dynamically, so that efficient use of frequency spectrum is possible. Additionally, when the parameters are determined at the time of CoMP transmission, because it is possible to consider the MIMO feedback information, it is possible to more preferably set the transmission parameters. For example, when determining the modulation method and coding rate at the time of CoMP transmission, by referencing the CQI for MIMO, it is possible to more preferably use the modulation method and coding rate.

There is no restriction to transmitting from the terminal device to the base station with the same timing for the MIMO feedback information and the CoMP feedback information at step S1413. For example, even in the case in which reporting is done of the CoMP feedback information and the MIMO feedback information using different subframes, it is possible to achieve the same type of effect as noted above. Also, the MIMO feedback information at step S1413 is not necessarily the same as the MIMO feedback information at step S1403. For example, the MIMO feedback information at step S1413 may be a part of the MIMO feedback information at step S1403. More specifically, the MIMO feedback information at step S1413 may be information indicating the broadband quality, with the MIMO feedback information at step S1403 indicating the broadband quality (status) and the narrowband quality (status). In this case as well, it is possible to achieve the effect as noted above.

The description of the present embodiment was for the case in which a CoMP mode terminal device reports not only CoMP feedback but also MIMO feedback to the base station based on the second embodiment. In the other above-described embodiments, in the case in which a CoMP mode terminal device reports MIMO feedback, in addition to CoMP feedback, to the base station, the same effect as noted above can be achieved.

Seventh Embodiment

In the first embodiment or in the second embodiment, the description was for the case in which wireless frames are synchronized between cells capable of CoMP (subframes having the same number of subframes are placed at the same times). In the seventh embodiment according to the present invention, the case in which wireless frames are not synchronized will be described.

Because the configurations of a base station and a terminal device in the seventh embodiment are the same as those of the base station (FIG. 7) and the terminal device (FIG. 8) in the first embodiment, their detailed descriptions will be omitted herein.

The present embodiment will be described below, with references made to the drawings.

Figure 15A:
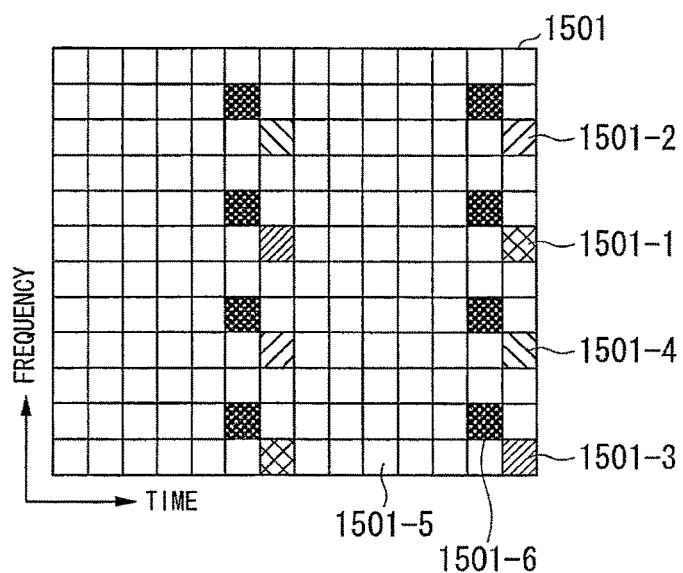
FIG. 15A is a drawing showing an example of the configuration of the reference signal in a seventh embodiment of the present invention.
Figure 15B:
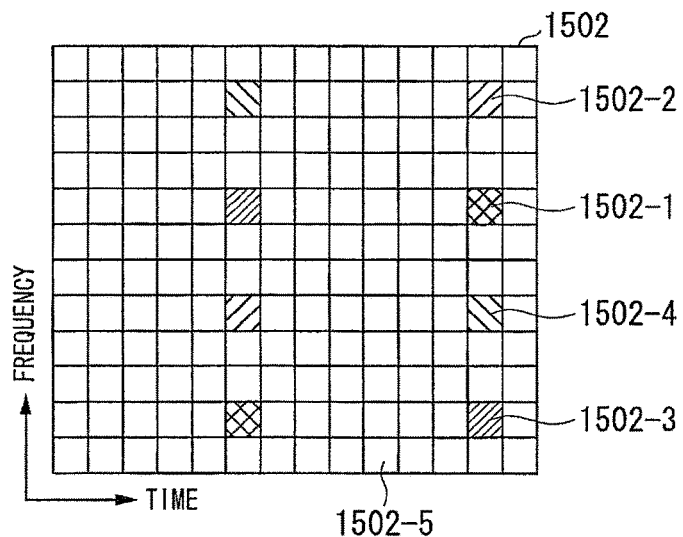
FIG. 15B is a drawing showing another example of the configuration of the reference signal in the seventh embodiment of the present invention.

FIG. 15A and FIG. 15B are drawings showing examples of the configuration of the reference signals that are referenced by the terminal device that performs CoMP. In the present embodiment, the description is for a cell configuration that is similar to that shown in FIG. 1 and FIG. 2.

A resource block 1501 as shown in FIG. 15A is transmitted from the base station 101 that covers the cell #1, this being a resource block that includes the MIMO reference signal at the cell #1.

A resource block 1502 as shown in FIG. 15B is transmitted from the base station 102 that covers the cell #2, this being a resource block that includes the CoMP reference signal that is transmitted from the cell #2 at the same time as the resource block that includes the MIMO reference signal at the cell #1.

Resource elements 1501-1 to 1501-4 within the resource block 1501 are resource elements onto which LTE-A reference signals are mapped. The resource element 1501-6 indicates a resource element that punctures. The resource element 1501-6 is a resource element in the cell #1 having the same frequency and the same time as a resource element with which the CoMP reference signal is transmitted from the cell #2. The other resource element 901-5 indicates a resource element onto which a signal other than an LTE-A reference signal (that is, a data signal, a control signal, an LTE reference signal, a reference signal for modulation, or the like) is mapped. In contrast, the resource elements 1502-1 to 1502-4 within the resource block 1501 indicate resource elements onto which LTE-A CoMP reference signals are mapped. The other resource element 1502-5 is a resource element onto which a signal other than an LTE-A reference signal (that is, a data signal, a control signal, an LTE reference signal, a reference signal for modulation, or the like) is mapped.

As shown in FIGS. 15A and 15B, definition is made such that the resource element mapping MIMO reference signal and the resource element mapping CoMP reference signal are different resource elements. By doing this, because MIMO reference signal of the local cell and CoMP reference signal of the local cell or another cell can be placed within the same subframe, reference signal placement is possible with a high degree of freedom.

Figure 16:
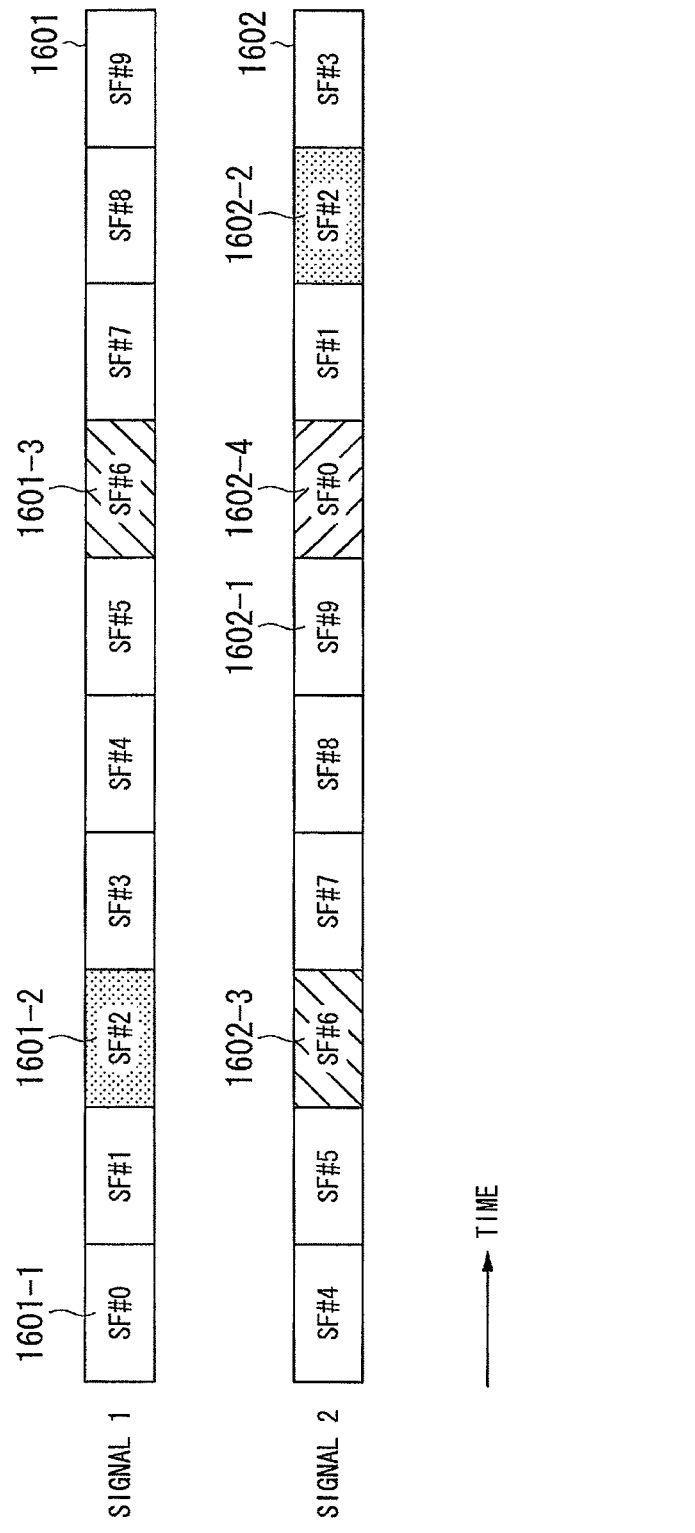
FIG. 16 is a drawing showing an example of the configuration of wireless frames in the same embodiment.
Figure 19:
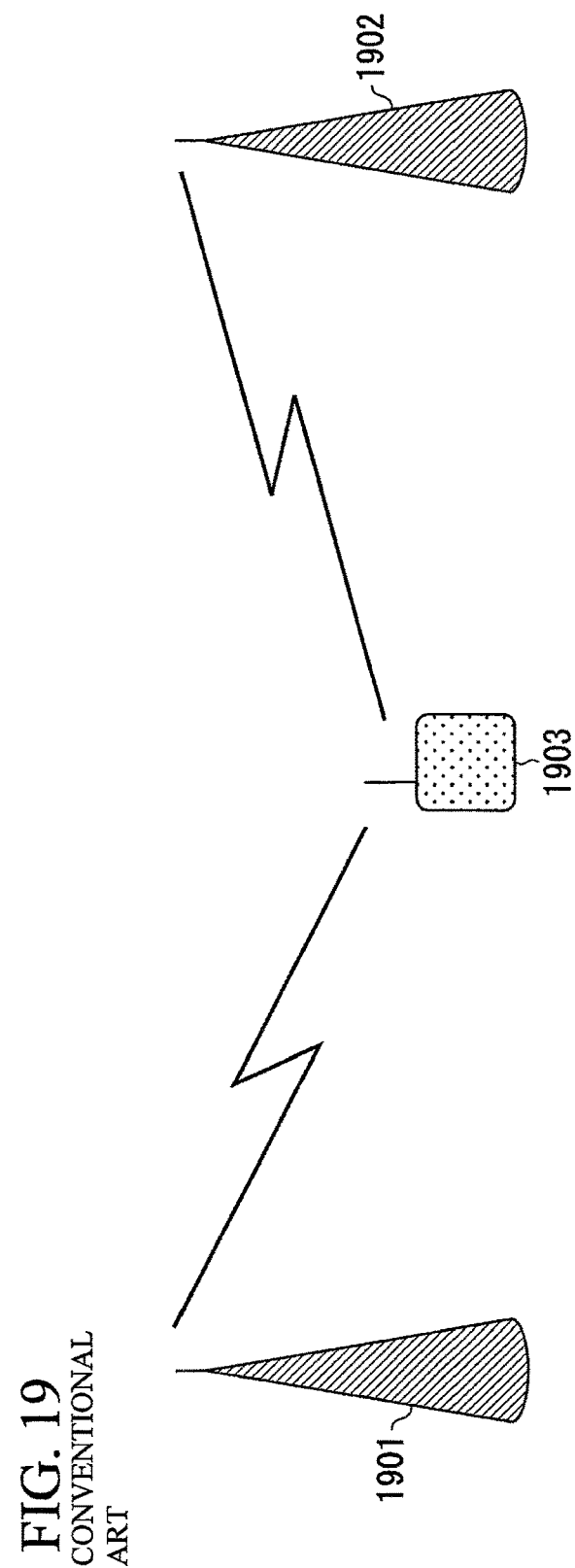
FIG. 19 is a drawing showing the configuration of a communication system that performs CoMP communication.

FIG. 16 is a drawing showing an example of the configuration of wireless frames transmitted from the base station 101 and the base station 102. In FIG. 16, the horizontal axis represents time. A wireless frame 1601 shown as signal 1 in FIG. 16 is transmitted from the base station 101 that covers the cell #1. A wireless frame 1602 shown as signal 2 in FIG. 16 is transmitted from the base station 102 that covers the cell #2. Each of the wireless frames includes 10 subframes SF#0 to SF#9. This drawing shows the case in which the wireless frames are offset by 5 subframes between cells.

The subframes 1601-2 and 1602-2 are subframes in which MIMO reference signals for MIMO communication in the cell #1 and the cell #2 are placed, respectively. The subframes 1601-3 and 1602-3 are subframes in which CoMP reference signals in the cell #1 and the cell #2 are placed, respectively. The subframes 1601-2 and 1602-4 are subframes that are transmitted in the same time with the subframes 1602-3 and 1601-3. For this reason, puncturing is done in the resource elements onto which the CoMP reference signals are mapped. For example, in the subframe 1601-2, a subframe in which the resource block 1501 in FIG. 15A is placed can be used. The other subframes 1601-1 and 1602-1 are normal subframes.

As described above, the terminal device 104 in FIG. 1 can measure the CoMP reference signal at the cell #1 in the subframe SF#6 with high accuracy. In the same manner, it can measure the CoMP reference signal at the cell #2 in the subframe SF#2 with high accuracy.

In this manner, the base station does not perform puncturing for the first reference signal that is referenced by a terminal device that does not perform CoMP. In contrast, the base station performs puncturing for the second reference signal that is referenced by a terminal device that performs CoMP, and places the first reference signal and the second reference signal into different subframes. By doing this, the terminal device can generate highly accurate feedback information.

Also, in the above-described each embodiment, although the description has been presented using the resource element or the resource block as the mapping unit for reference signals, and using the subframe or the wireless frame as the transmission unit in the time direction, this is not restriction. Alternatively, even if the region and the time unit that are configured by arbitrary frequency and time are used, the same effect can be achieved.

Furthermore, each of the above-described embodiments has been described for the case in which notification for instruction of MIMO feedback from the base station or for instruction of CoMP feedback is made to the terminal device. These instructions are for instructing the three process steps of measuring for MIMO or CoMP, generating of feedback information for MIMO or CoMP, and reporting of feedback information for MIMO or CoMP. By performing the three process steps using one signaling (or by renewing a parameter at the same timing), the efficient signaling is possible.

Alternatively, the three process steps may be instructed using different timing or signaling. By doing this, flexible instruction can be achieved, thereby enabling improvement of performance of communication with respect to signaling processing. For example, notifications of a CoMP measurement and of a CoMP feedback information generation are made using different timing or signaling from the base station to the terminal device, thereby enabling flexible setting of a cell group to be measured and a cell group in which feedback information is to be generated.

Also, although the above described each embodiment has been presented for the cases in which switching from the initial mode to the MIMO mode and from the MIMO mode to the CoMP mode are done, this is not restriction. For example, in the cases in which switching from the initial mode to the CoMP mode is done and then transferring from the CoMP mode to the MIMO mode is done, the same scheme can be used and can achieve the same effect.

Alternatively, a program for the purpose of implementing all or part of the function of the base station in FIG. 7 and all or part of the function of the terminal device in FIG. 8 may be recorded on a computer-readable recording medium, and a computer system may read and execute the program recorded on the record medium, thereby performing the various part processing. The term "computer system" includes an operating system and also hardware, such as peripheral devices.

The term "computer system" also includes a webpage-providing environment (or display environment) if the WWW system is used.

The term "computer-readable medium" refers to a portable medium, such as a flexible disk, an optical-magnetic disc, a ROM, and a CD-ROM, and a storage device, such as a hard disk, that is built into a computer system. The term "computer-readable medium" includes something that dynamically retains a program for a short time, for example, a communication line when the program is transmitted via a network such as the Internet, a communication line such as a telephone line, or the like, as well as a medium to retain a program for a certain time, for example, a flash memory internally provided in a computer system acting as the server and client in that case. The program may have the object of implementing a part of the above-described function, and it may also implement the above-described function in combination with a program already stored in a computer system.

Alternatively, implementation of all or part of the function of the base station in FIG. 7 and all or part of the function of the terminal device in FIG. 8 may be done by incorporation into an integrated circuit.

Although the embodiments of the present invention are described above with references made to the accompanying drawings, the specific configuration is not limited to the embodiments, and various designs, changes and the like are encompassed within the scope thereof, without departing from the present invention.

INDUSTRIAL APPLICABILITY

The present invention is preferable for use as a wireless transmitter apparatus, a wireless receiver apparatus, a wireless communication system, and a wireless communication method.

REFERENCE SYMBOLS 101, 102, 201: Transmitter apparatus
103, 104: Receiver apparatus
301, 302, 303, 401, 402, 403, 901, 902, 903, 1501, 1502: Resource block
301-1 to 301-5, 302-1 to 302-5, 303-1 to 303-5, 401-1 to 401-6, 402-1 to 402-6, 403-1 to 403-6, 901-1 to 301-5, 902-1, 902-2, 903-1, 903-2, 1501-1 to 1501-6, 1502-1 to 1502-5: Resource element
501, 502, 503, 1001, 1002, 1003, 1601, 1602: Wireless frame
501-1 to 501-3, 502-1 to 502-3, 503-1 to 503-3, 1001-1 to 1001-4, 1002-1 to 1002-4, 1003-1 to 1003-4, 1601-1 to 1601-3, 1602-1 to 1602-4: Subframe
701-1, 701-2: Coding unit
702-1, 702-2: Scrambling unit
703-1, 703-2: Modulating unit
704: Layer mapping unit
705: Precoding unit
706: Reference signal generating unit
707-1, 707-2: Resource element mapping unit
708-1, 708-2: OFDM signal generating unit
709-1, 709-2: Transmitting antenna
710: Receiving antenna
711: Received signal processing unit
712: Feedback information processing unit
713: Higher layer
801-1, 801-2: Receiving antenna
802-1, 802-2: OFDM signal demodulating unit
803-1, 803-2: Resource element demapping unit
804: Filter unit
805: Deprecoding unit
806: Layer demapping unit
807-1, 807-2: Demodulating unit
808-1, 808-2: Descrambling unit
809-1, 809-2: Decoding unit
810: Higher layer
811: Reference signal measuring unit
812: Feedback information generating unit
813: Transmitted signal generating unit
814: Transmitting antenna
1701, 1901, 1902: Transmitter apparatus
1702, 1903: Receiver apparatus
1801: Resource block
1801-1 to 1801-6: Resource element

The invention claimed is:

1. A terminal apparatus configured and/or programmed to communicate with a base station apparatus configuring a first cell, the terminal apparatus comprising:
acquiring circuitry configured and/or programmed to acquire, from the base station apparatus by using higher layer signaling, first information, second information, third information, and fourth information, the first information specifying a first number indicating a first subframe, the first subframe including a first resource element in which a first reference signal of the first cell is placed, the second information specifying a second number indicating a second subframe, the second subframe including a second resource element in which a second reference signal of a second cell other than the first cell is to be placed, the second resource element being not used to transmit a signal of the first cell, the third information indicating a position of the first resource element, and the fourth information indicating a position of the second resource element; and
demapping circuitry configured and/or programmed to demap data, wherein,
in the first subframe, the data is mapped on resource elements which do not include the first resource element,
in the second subframe, the data is mapped on resource elements which do not include the second resource element, and
the first subframe and the second subframe are in the first cell.

2. The terminal apparatus according to claim 1, wherein the acquiring circuitry is configured and/or programmed to acquire, from the base station apparatus, third information specifying the first resource element.

3. The terminal apparatus according to claim 1, wherein the acquiring circuitry is configured and/or programmed to acquire, from the base station apparatus, fourth information specifying the second resource element.

4. A base station apparatus configured and/or programmed to configure a first cell and to communicate with a terminal apparatus, the base station apparatus comprising:
notifying circuitry configured and/or programmed to notify, by using higher layer signaling, the terminal apparatus of first information, second information, third information, and fourth information, the first information specifying a first number indicating a first subframe, the first subframe including a first resource element in which a first reference signal of the first cell is placed, the second information specifying a second number indicating a second subframe, the second subframe including a second resource element in which a second reference signal of a second cell other than the first cell is to be placed, the second resource element being not used to transmit a signal of the first cell, the third information indicating a position of the first resource element, and the fourth information indicating a position of the second resource element; and
mapping circuitry configured and/or programmed not to map data onto the first resource element, when the data is mapped onto resource elements included in the first subframe, and not to map data onto the second resource element, when the data is mapped onto resource elements included in the second subframe,
in the first subframe, the data is mapped on resource elements which do not include the first resource element, and
the first subframe and the second subframe are in the first cell.

5. The base station apparatus according to claim 4, wherein the notifying circuitry is configured and/or programmed to notify the terminal apparatus of third information specifying the first resource element.

6. The base station apparatus according to claim 4, wherein
the notifying circuitry is configured and/or programmed to notify the terminal apparatus of fourth information specifying the second resource element.

7. A method performed by a terminal apparatus communicating with a base station apparatus configuring a first cell, the method comprising:
acquiring, from the base station apparatus by using higher layer signaling, first information, second information, third information, and fourth information, the first information specifying a first number indicating a first subframe, the first subframe including a first resource element in which a first reference signal of the first cell is placed, the second information specifying a second number indicating a second subframe, the second subframe including a second resource element in which a second reference signal of a second cell other than the first cell is to be placed, the second resource element being not used to transmit a signal of the first cell, the third information indicating a position of the first resource element, and the fourth information indicating a position of the second resource element; and
demapping data, wherein
in the first subframe, the data is mapped on resource elements which do not include the first resource element,
in the second subframe, the data is mapped on resource elements which do not include the second resource element, and
the first subframe and the second subframe are in the first cell.

8. A method performed by a base station apparatus configuring a first cell and communicating with a terminal apparatus, the method comprising:
notifying, by using higher layer signaling, the terminal apparatus of first information, second information, third information, and fourth information, the first information specifying a first number indicating a first subframe, the first subframe including a first resource element in which a first reference signal of the first cell is placed, the second information specifying a second number indicating a second subframe, the second subframe including a second resource element in which a second reference signal of a second cell other than the first cell is to be placed, the second resource element being not used to transmit a signal of the first cell, the third information indicating a position of the first resource element, and the fourth information indicating a position of the second resource element;
not mapping data onto the first resource element, when the data is mapped onto resource elements included in the first subframe; and
not mapping data onto the second resource element, when the data is mapped onto resource elements included in the second subframe
in the first subframe, the data is mapped on resource elements which do not include the first resource element, and,
the first subframe and the second subframe are in the first cell.

* * * * *